(12) United States Patent
Yoshioka et al.

(10) Patent No.: US 9,160,972 B2
(45) Date of Patent: Oct. 13, 2015

(54) DIGITAL SIGNATURE SYSTEM AND DIGITAL SIGNING METHOD

(75) Inventors: Takashi Yoshioka, Kawasaki (JP); Takato Ohashi, Fukuoka (JP); Kiyohide Yamashita, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 885 days.

(21) Appl. No.: 12/336,113

(22) Filed: Dec. 16, 2008

(65) Prior Publication Data

US 2009/0164793 A1    Jun. 25, 2009

(30) Foreign Application Priority Data

Dec. 19, 2007    (JP) ................................ 2007-326801

(51) Int. Cl.
*H04N 7/167* (2011.01)
*H04L 9/32* (2006.01)

(52) U.S. Cl.
CPC ............ *H04N 7/1675* (2013.01); *H04L 9/3236* (2013.01); *H04L 9/3247* (2013.01); *H04L 9/3255* (2013.01)

(58) Field of Classification Search
CPC .. H04N 7/1675; H04L 9/3236; H04L 9/3247; H04L 9/3255
USPC ........................................................ 713/180
See application file for complete search history.

(56) References Cited

U.S. PATENT DOCUMENTS

| | | | | |
|---|---|---|---|---|
| 5,751,809 A * | 5/1998 | Davis et al. | ................... | 713/176 |
| 6,341,349 B1 * | 1/2002 | Takaragi et al. | ............. | 713/168 |
| 2005/0235154 A1 * | 10/2005 | Serret-Avila | ................... | 713/176 |
| 2007/0106908 A1 | 5/2007 | Miyazaki et al. | | |
| 2008/0256362 A1 | 10/2008 | Takenaka | | |

FOREIGN PATENT DOCUMENTS

| | | |
|---|---|---|
| EP | 0 840 478 A2 | 5/1998 |
| JP | 2004-336702 | 11/2004 |
| JP | 2007-129507 | 5/2007 |

(Continued)

OTHER PUBLICATIONS

"RealNetworks RealSystem 5.0 Products: Complete streaming media solutions for the Internet and Corporate Intranets" article dated Jan. 21, 1998 as verified by the Internet Archive (2 pages) http://web.archive.org/web/19980121233421/http://www.real.com/products/index.html.*

(Continued)

*Primary Examiner* — Joseph P Hirl
*Assistant Examiner* — Thomas Gyorfi
(74) *Attorney, Agent, or Firm* — Staas & Halsey LLP

(57) ABSTRACT

A digital signature program includes computer-executable instructions for giving a numerical value in a state where header information necessary for playback of each partial data item may be added to the partial data item resulting from the division to a one-way function to generate an output value sequence of the one-way function concerning the multiple partial data items. The program also includes computer-executable instructions for generating binary trees concerning the streaming data, having leaves including only the output values in the output value sequence; and computer-executable instructions for using an output value indicating a root of the generated binary trees to generate a digital signature of a signer for the streaming data.

12 Claims, 33 Drawing Sheets

(56) References Cited

FOREIGN PATENT DOCUMENTS

| WO | 98/34403 | 8/1998 |
|---|---|---|
| WO | 2006/008847 | 1/2006 |

OTHER PUBLICATIONS

"RealNetworks RealSystem 5.0 Technology Showcase: Breakthrough innovations in streaming media" article dated Jan. 21, 1998 as verified by the Internet Archive (1 page) http://web.archive.org/web/19980121233415/http://www.real.com/showcase/tech/index.html.*

Translation of Office Action mailed Dec. 1, 2009 in Patent Application No. 2007-326801.

Stefano Chessa et al., "Mobile Application Security for Video Streaming Authentication and Data Integrity Combining Digital Signature and Watermarking Techniques", Vehicular Technology Conference, 2007.

European Search Report mailed Apr. 29, 2009 and issued in corresponding European Patent Application 08171974.2-2223.

* cited by examiner

FIG. 19

PIAT1

| PIAT SIGNATURE INFORMATION ABOUT SIGNER |
|---|
| E8 BD 73 5D 13 65 58 1F 79 AF E9 70 21 55 FA 79 |
| 11 27 A0 FD B8 0B 10 D0 DA 07 02 0F 10 30 82 6A<br>5F 2D 68 3A CE 3E E0 7B 80 19 FF BF 75 D3 D8 24<br>06 3E 15 D9 89 6A 0F 61 5D 63 90 D0 89 21 BD 8D<br>... 31 0F A1 77 |

SIGN1

DIGITAL SIGNATURE SYSTEM AND DIGITAL SIGNING METHOD

CROSS-REFERENCE TO RELATED APPLICATION

This application is related to and claims priority to application having Japanese Patent Application No. 2007-326801, filed on Dec. 19, 2007 and incorporated by reference herein.

BACKGROUND

1. Field

The embodiments discussed herein are directed to a digital signature system and a digital signing method capable of assuring the validity of partially extracted streaming data and allowing a third party to certify the streaming data.

2. Description of the Related Art

Installation of surveillance cameras and installation of drive recorders in business vehicles have become widespread in recent years.

Accordingly, motion pictures captured by such apparatuses are often presented as evidences.

Conversations between clients and operators are recorded and the recorded conversations are held as evidences in order to take measures against troubles in telephone transactions or support businesses.

In use of motion pictures or sounds as evidences, media on which the motion pictures or sounds are recorded are directly presented nowadays. The media include video tapes, image files, audio files.

In addition, apparatuses and recording media are digitized in recent years. It is generally easy to tamper or edit digitized information, compared with analog information. Accordingly, when the digital information is presented as evidences, it is necessary to perform verification by third parties, such as digital signature or time stamping.

In the direct presentation of the media on which motion pictures or sounds are recorded, part of the data on the media, which is not related to the evidences, is also presented.

Use of personal private information is often restricted in recent years, and it is required to indicate or partially delete such information in response to their own requests.

In order to fulfill the requirement, studies of signature technologies are advancing in which the originality (integrity) of part of electronic documents is assured or partially concealed (filled with black).

For example, conventionally a partial integrity assurance technology (PIAT) is disclosed in order to resolve a problem in which partial concealment of a document makes it impossible to verify a signature attached to the document). Application of the PIAT allows signatures attached to electronic documents to be verified even in a state where the electronic documents are partially filled with black and also allows third parties to certify that the documents are not altered excluding the parts filled with black (modification or addition is allowed in the parts).

However, when part of large data, such as motion pictures or sounds for long times, is extracted, the amount of information related to the signature is greatly increased with the conventional technology described above.

SUMMARY

It is an aspect of the embodiments discussed herein to provide a digital signature program recorded on a recording medium including computer-executable instructions for dividing streaming data concerning at least either of video or audio into multiple partial data items including at least one data group that is a minimum unit in which the streaming data can be played back; computer-executable instructions for giving a numerical value in a state where header information necessary for playback of each partial data item may be added to the partial data item resulting from the division to a one-way function to generate an output value sequence of the one-way function concerning the multiple partial data items; computer-executable instructions for generating binary trees concerning the streaming data, having leaves including only the output values in the generated output value sequence; and computer-executable instructions for using an output value indicating a root of the generated binary trees to generate a digital signature of a signer for the streaming data.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 19 illustrates a PIAT signature information about a signer;

DETAILED DESCRIPTION OF THE EMBODIMENTS

Figure 1:
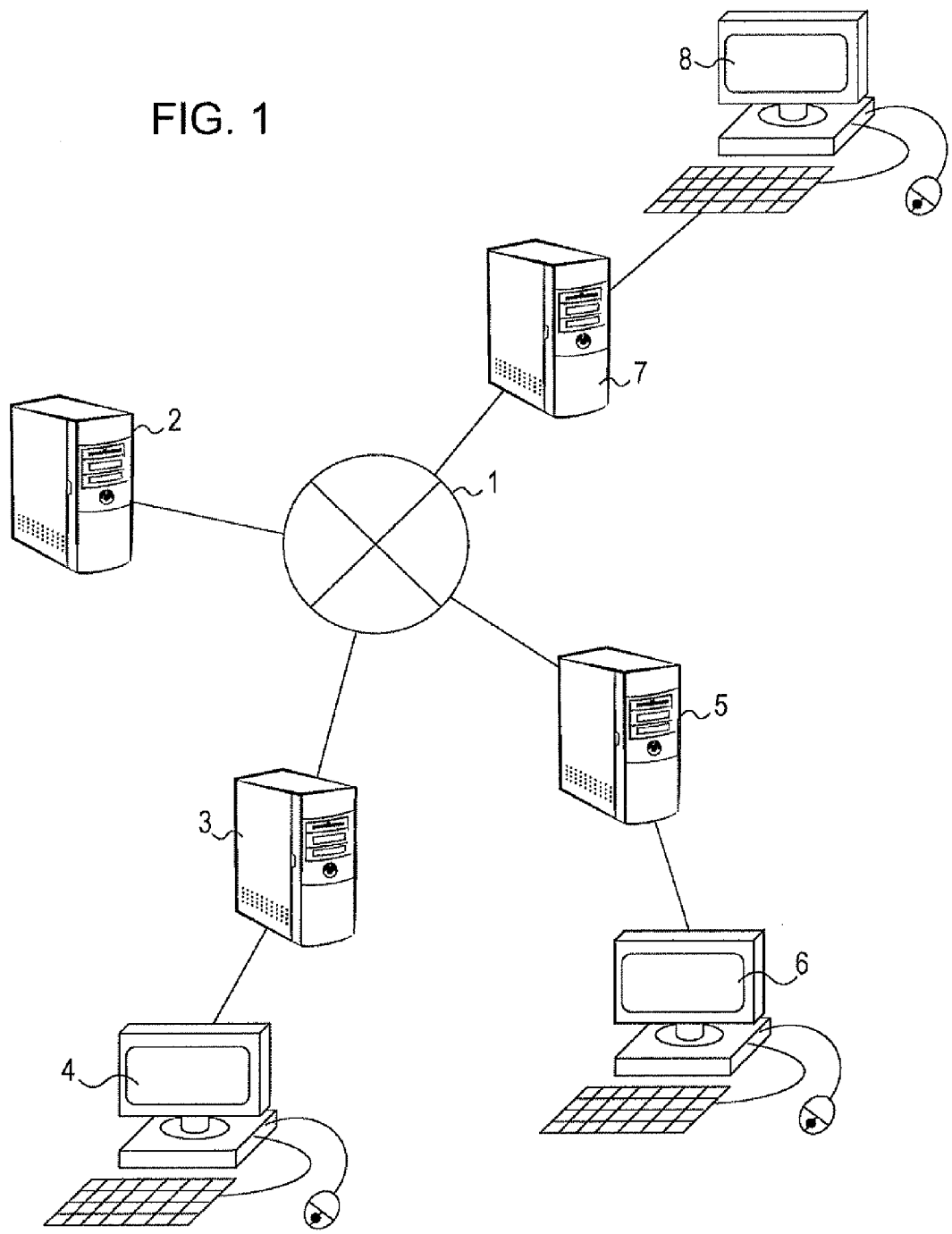
FIG. 1 illustrates an exemplary embodiment.

FIG. 1 illustrates an example of the configuration of a system according to a first embodiment of the present invention. The system according to an exemplary embodiment includes a certificate authority server 2, a signature generation server 3, a signer terminal 4, an information extraction server 5, an extractor terminal 6, a signature verification server 7, and a verifier terminal 8. The certificate authority server 2, the signature generation server 3, the information extraction server 5, and the signature verification server 7 can communicate with each other over a network 1, such as the Internet.

Although the servers and terminals communicate with each other over the network 1, such as the Internet, in an exemplary embodiment, the servers and terminals may communicate with each other over a communication network, such as an intranet or a wide area network.

The certificate authority server 2 is the server of a certificate authority managing digital signature information. In a typical digital signature technology, a transmitter transmits signature information, signature target information, and a public key certificate to a destination. The signature information results from encryption of information given by digesting the signature target information (subjected to a message digest) with a private key of the transmitter A receiver confirms the validity of the public key certificate, decrypts the encrypted signature information with a public key included in the public key certificate, and compares the decrypted signature information with digest information obtained from the signature target information. The certificate authority server 2 determines whether the information is transmitted from a valid transmitter based on the determination of whether the decrypted signature information coincides with the digest information.

Figure 2:
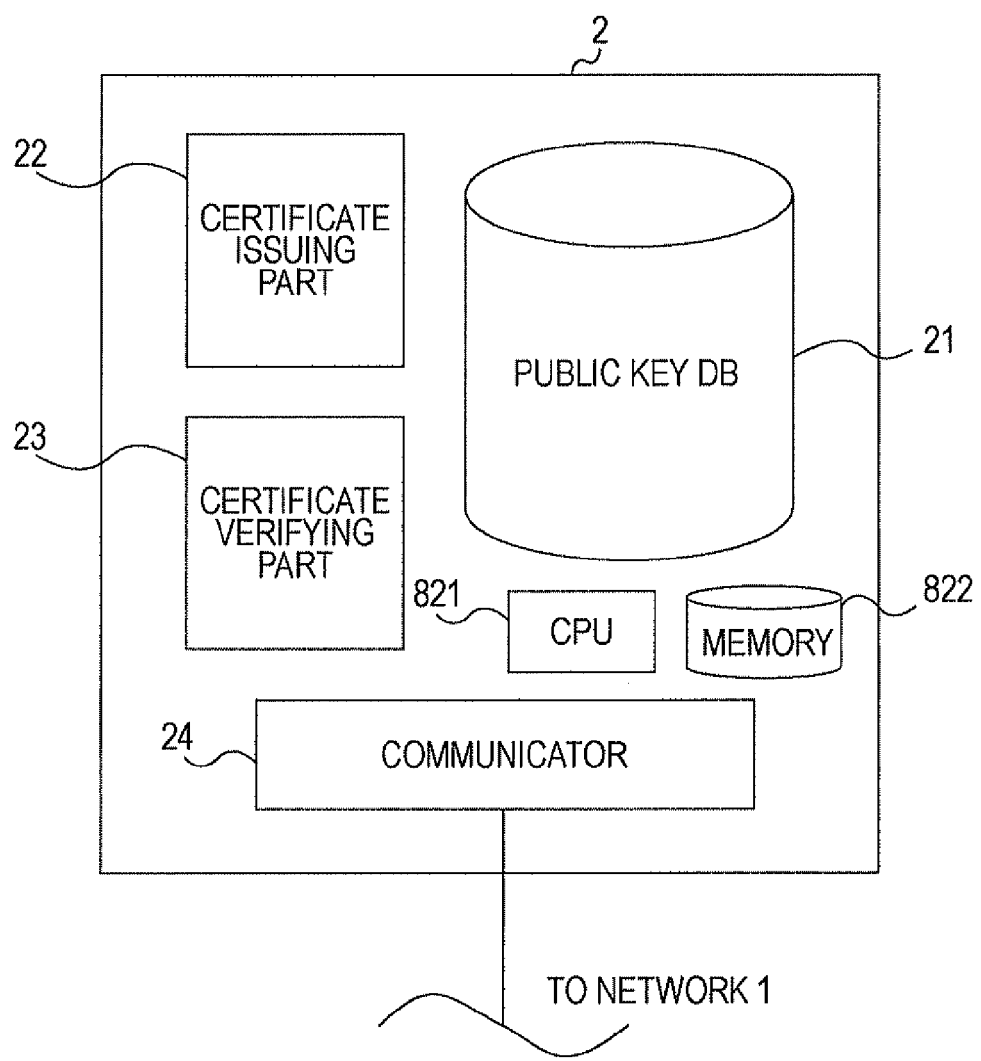
FIG. 2 illustrates an exemplary certificate authority server.

FIG. 2 illustrates an exemplary certificate authority server 2. The certificate authority server 2 includes a public key database 21 in which the public keys of a signer and an extractor are stored, a certificate issuing part 22 issuing a public key certificate in response to a request, a certificate verifying part 23 verifying the public key certificate, a communicator 24 for performing communication over the network 1, a central processing unit (CPU) 821, and a memory 822.

Figure 3:
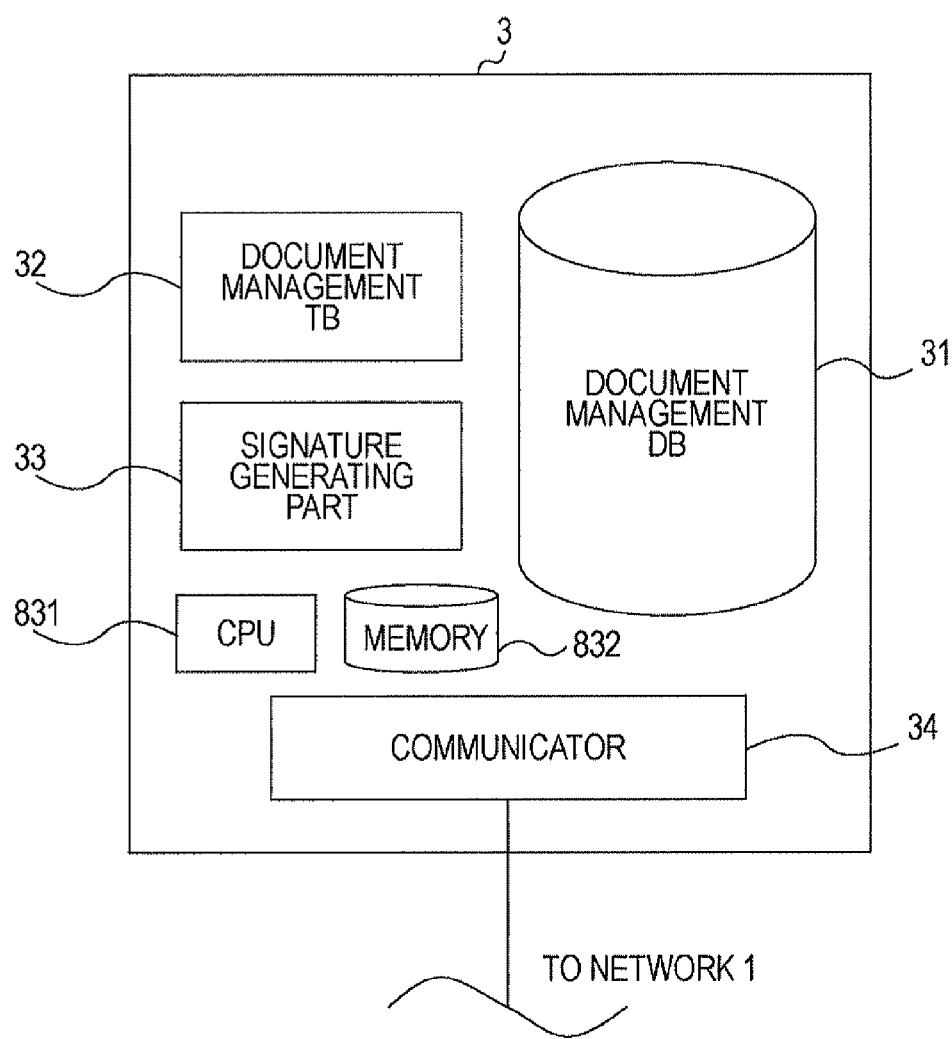
FIG. 3 illustrates an exemplary signature generation server.

The signature generation server 3 generates a signature of the signer. FIG. 3 illustrates an exemplary signature generation server 3. The signature generation server 3 includes a document management database 31 in which information transmitted to the information extraction server 5 described below is stored, a document management table 32 controlling access to the document management database 31, a signature generating part 33 adding PIAT signature information about the signer and a digital signature thereof to the signature target information, a communicator 34 for performing communication over the network 1, a CPU 831, and a memory 832.

The signer terminal 4 is used by the signer to operate the signature generation server 3. The signer terminal 4 is capable of communication with the signature generation server 3.

Figure 4:
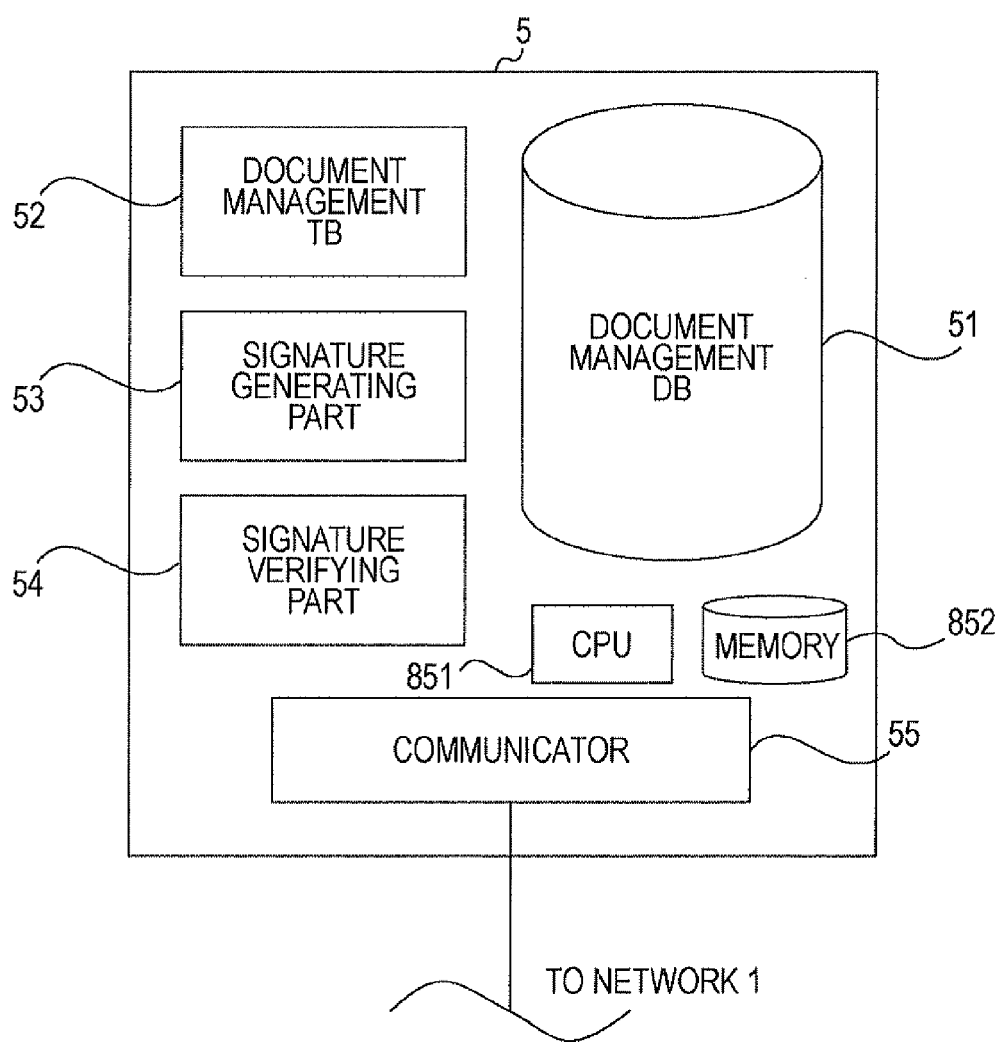
FIG. 4 illustrates an exemplary information extraction server.

FIG. 4 illustrates an exemplary information extraction server 5. The information extraction server 5 includes a document management database 51 in which information transmitted from the signature generation server 3 is stored and in which information to be transmitted to the signature verification server 7 described below is stored, a document management table 52 controlling access to the document management database 51, a signature generating part 53 adding PIAT signature information about the extractor and a digital signature thereof to information transmitted from the signature generation server 3, a signature verifying part 54 verifying the digital signature added to information transmitted from an external apparatus, a communicator 55 for performing communication over the network 1, a CPU 851, and a memory 852.

The extractor terminal 6 is capable of communication with the information extraction server 5 via a communication line, such as a local area network (LAN). The extractor terminal 6 is used by the extractor to operate the information extraction server 5.

Figure 5:
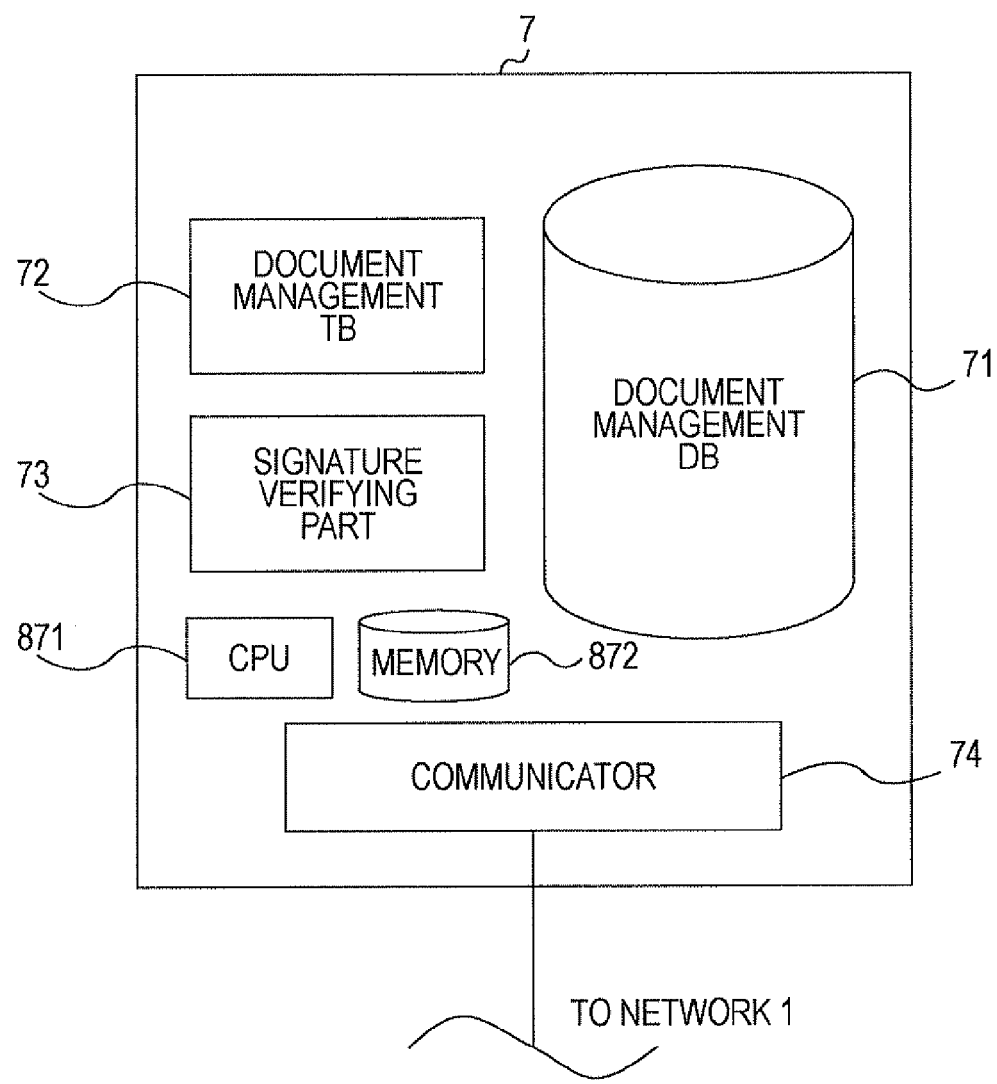
FIG. 5 illustrates an exemplary signature verification server.

FIG. 5 illustrates an exemplary signature verification server 7. The signature verification server 7 verifies a signature added to data. The signature verification server 7 includes a document management database 71 in which information transmitted from the information extraction server 5 is stored, a document management table 72 controlling access to the document management database 71, a signature verifying part 73 verifying the digital signature and the PIAT signature information added to information that is transmitted, communication mean 74 for performing communication over the network 1, a CPU 871, and a memory 872.

The verifier terminal 8 is used by a verifier to operate the signature verification server 7. The verifier terminal 8 is capable of communication with the signature verification server 7 via a communication line, such as a LAN.

Processes according to an exemplary embodiment will be described.

A digital signature process according to an exemplary embodiment will now be described. The signature generation server 3 or the information extraction server 5 may serve as a transmission apparatus in the digital signature process and a user operating the transmission apparatus serves as a transmitter.

The transmitter may generate a pair of keys (a private key and a public key) and transmits the public key to the certificate authority server 2 to cause the certificate authority server 2 to issue a public key certificate. The private key and the public key certificate are stored in a memory (for example, the memory 832) in the transmission apparatus When the transmission apparatus receives a transmission instruction from the transmitter the transmission apparatus generates digest information for information to which a digital signature may be added (signature target information). The digest information is encrypted with the private key of the transmitter to generate signature information.

Next, the transmission apparatus transmits the signature target information, the signature information, and the public key certificate of the transmitter to a destination. A reception apparatus receives the public key certificate and uses the received public key certificate to decrypt the signature information.

In the above process, if the public key certificate of the transmitter can be used to decrypt the signature information, the signature information can be certified to be really transmitted from the transmitter. Then, the reception apparatus generates a digest of the signature target information and compares the digest with the decrypted information to confirm whether the digest coincides with the decrypted information. If the digest coincides with the decrypted information, the reception apparatus determines that the information is not tampered.

The digest information is information (hash information) calculated from the signature target information by using a cryptologic one-way hash function. Since the hash information can be used to compress the signature target information, the hash information is also called a "message digest".

The hash information generated by using the cryptologic one-way hash function is the only information that can be generated from the signature target information, and the original information cannot be restored from the generated hash information. Accordingly, the hash information is often used in encryption of information and generation of digital signatures. The cryptologic one-way hash function uses various algorithms, such as "Message Digest Algorithm 5 (MD5)", "Secure Hash Algorithm 1 (SHA-1)", and "Secure Hash Algorithm 256 (SHA-256)". According to an exemplary embodiment, the algorithm (a hash information generating algorithm) used in the information to which the signature may be added is recorded in the public key certificate.

Figure 6:
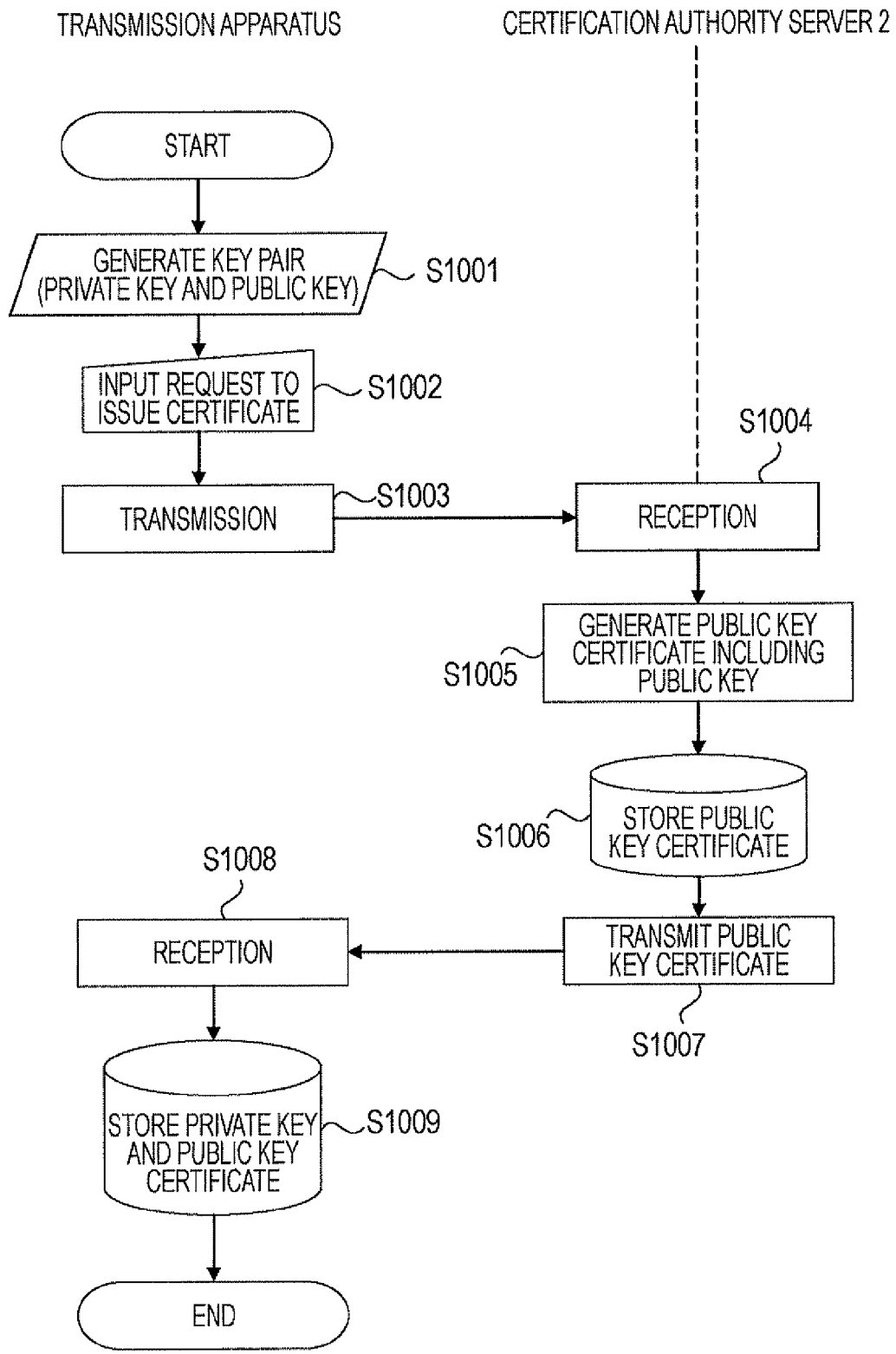
FIG. 6 illustrates an exemplary registration process of a public key.

A registration process of a public key performed between the transmission apparatus and the certificate authority server 2 will now be described. FIG. 6 is a flowchart showing an example of the registration process of a public key.

Referring to FIG. 6, in Operation S1001, the transmitter operates the transmission apparatus to generate a pair of keys (a private key and a public key). In Operation S1002, the transmitter operates the transmission apparatus to input information to request for issuance of a certificate. In Operation S1003, the transmission apparatus transmits the input information to request for issuance of a certificate to the certificate authority server 2 along with the public key.

In Operation S1004, the certificate issuing part 22 in the certificate authority server 2 receives the information with the a communicator 24. In Operation S1005, the certificate issuing part 22 generates a public key certificate including the public key. In Operation S1006, the certificate issuing part 22 stores the generated public key certificate in the public key database 21.

In Operation S1007, the certificate issuing part 22 controls the a communicator 24 so as to transmit the issued public key certificate to the transmission apparatus from which the information to request for issuance of a certificate is transmitted over the network 1.

In Operation S1008, the transmission apparatus receives the transmitted public key certificate. In Operation S1009, the transmission apparatus stores the private key generated in Operation S1001 and the public key certificate issued by the certificate authority server 2 in an own storage device (a storage area (for example, the memory 832) in the signature generating part 33 in the signature generation server 3 or a storage area (for example, the memory 852) in the signature generating part 53 in the information extraction server 5). Then, the registration process of a public key is terminated FIGS. 7 and 8 illustrate an exemplary transmission and reception process of information with a digital signature and a verification process in the reception apparatus.

Figure 7:
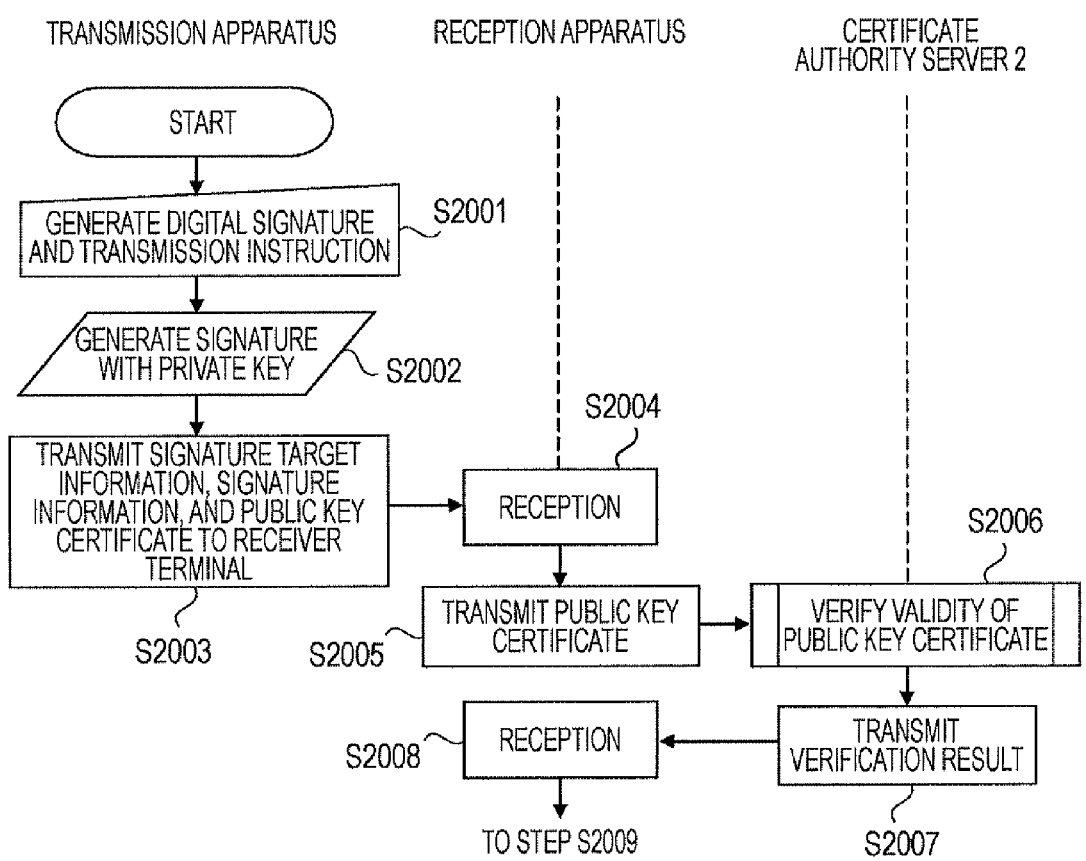
FIG. 7 illustrates an exemplary transmission and reception process of information with a digital signature and a verification process in a reception apparatus.
Figure 8:
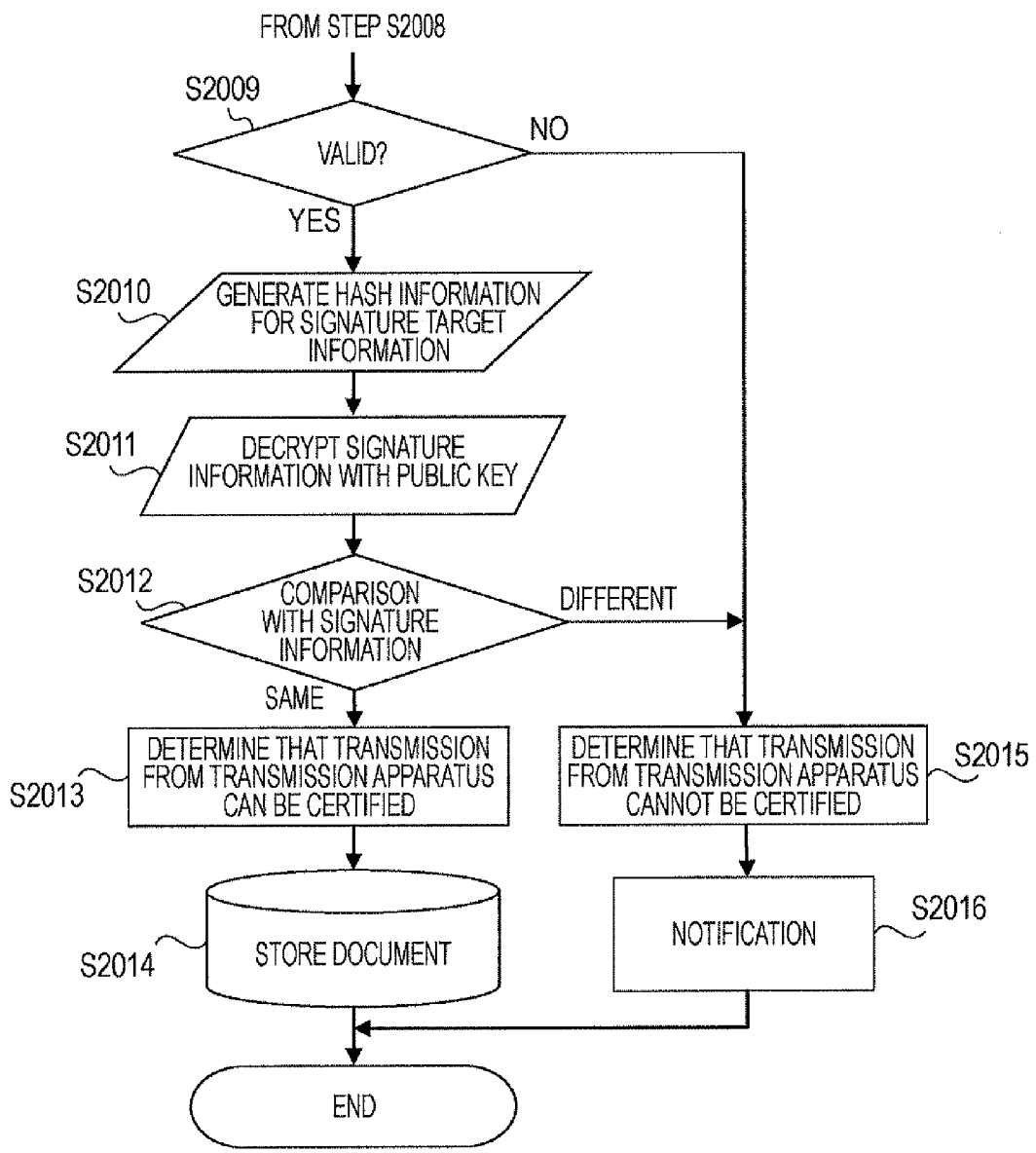
FIG. 8 illustrates a continuation of the exemplary transmission and reception process in FIG. 7.

Referring to FIG. 7, in Operation S2001, the transmitter performs a process of generating a digital signature for information to which the digital signature may be added and inputs an instruction to transmit the signature target information to the reception apparatus. In Operation S2002, the transmission apparatus encrypts the digest information (hash information) for the signature target information for which the instruction is input with the private key stored in the storage area. In Operation S2003, the transmission apparatus transmits the signature target information, the signature information, and the public key certificate that is stored to the reception apparatus.

In Operation S2004, the reception apparatus receives the information. In Operation S2005, the reception apparatus transmits the public key certificate to the certificate authority server 2. The certificate authority server 2 may support a series of functions, such as a function of issuing the certificate and a function of verifying the certificate. In Operation S2006, the certificate authority server 2 verifies the validity of the received public key certificate. In Operation S2007, the certificate authority server 2 transmits the result of the verification of the validity to the reception apparatus.

In Operation S20081 the reception apparatus receives the result of the verification of the validity. Referring to FIG. 8, in Operation S2009, the reception apparatus determines whether the public key certificate is valid. If the reception apparatus determines that the public key certificate is valid, then in Operation S2010, the reception apparatus refers to the hash information generating algorithm included in the public key certificate of the transmitter, acquired from the transmission apparatus, to generate hash information from the signature target information received from the transmission apparatus.

In Operation S2011, the reception apparatus uses the public key included in the public key certificate to decrypt the signature information received from the transmission apparatus. In Operation S2012, the reception apparatus compares the hash information generated in Operation S2010 with the information obtained from the decryption operation in Operation S2011 to determine whether the hash information coincides with the information obtained from the decryption operation in Operation S2011. If the reception apparatus determines in Operation S2013 that the hash information coincides with the information obtained from the decryption operation in Operation S2011 (the determination in Operation S2012 indicates "same"), then in Operation S2014, the reception apparatus stores the series of information. The storage of the information by the reception apparatus in Operation S2014 means that it is certified that the information is transmitted from the transmission apparatus (transmitter) and the information is not altered.

If the reception apparatus determines that the hash information generated in Operation S2010 does not coincide with the information obtained from the decryption operation in Operation S2011 (the determination in Operation S2012 indicates "different"), then in Operation S2015, the reception apparatus determines that it is not certified that the information to which the signature may be added is transmitted from the transmission apparatus (transmitter) (or determines that the information is altered). In Operation S2016, the reception apparatus indicates that it is not certified that the information is transmitted from the transmission apparatus to the operator of the reception apparatus by, for example, screen display. If the reception apparatus determines in Operation S2009 that the public key certificate is not valid (the determination in Operation S2009 is negative), then in Operation S2015, the reception apparatus determines that it is not certified that the information to which the signature may be added is transmitted from the transmission apparatus (transmitter). In Operation S2016, the reception apparatus indicates that it is not certified that the information is transmitted from the transmission apparatus to the operator of the reception apparatus by, for example, screen display.

Figure 9:
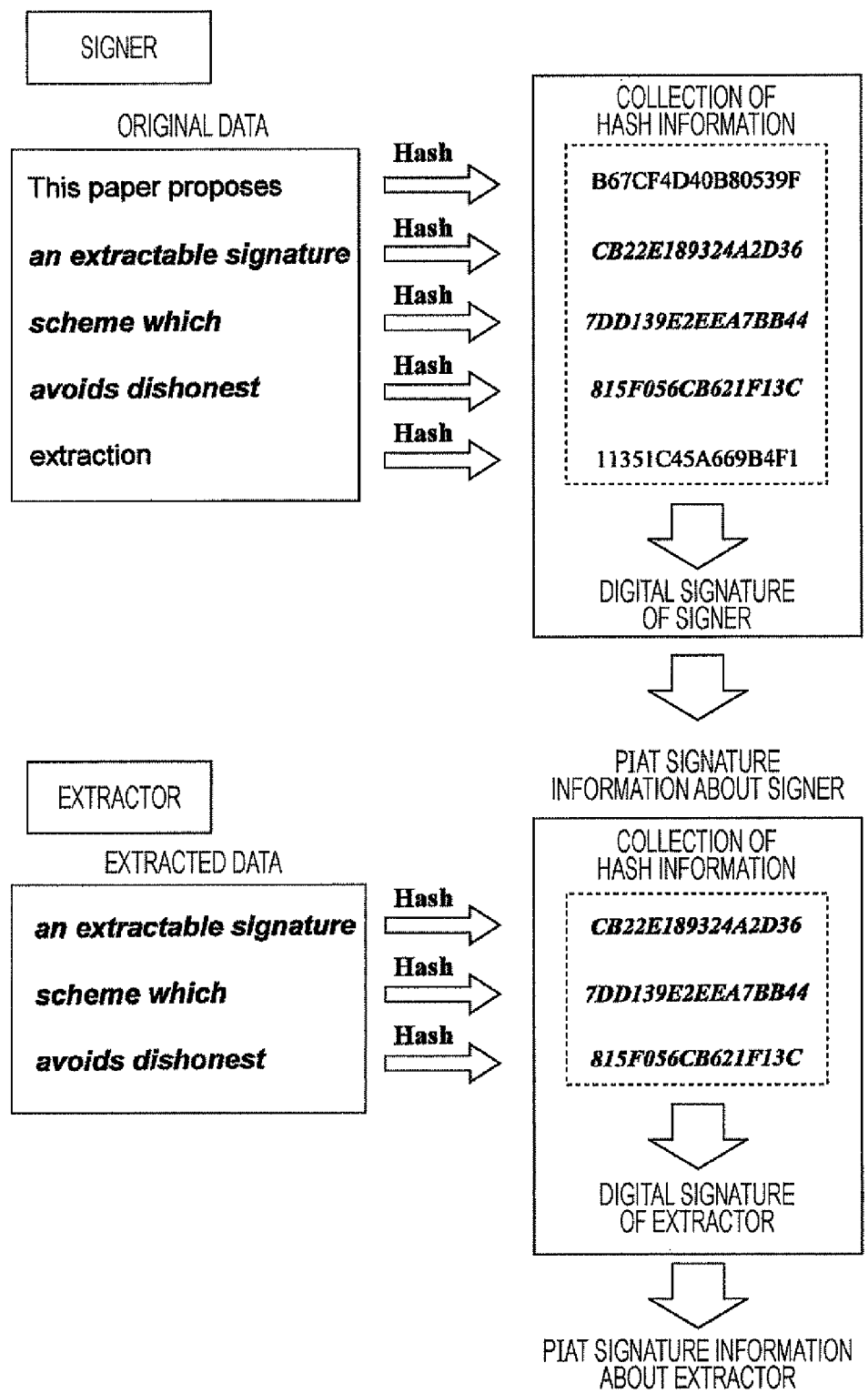
FIG. 9 illustrates an exemplary PIAT algorithm.
Figure 10:
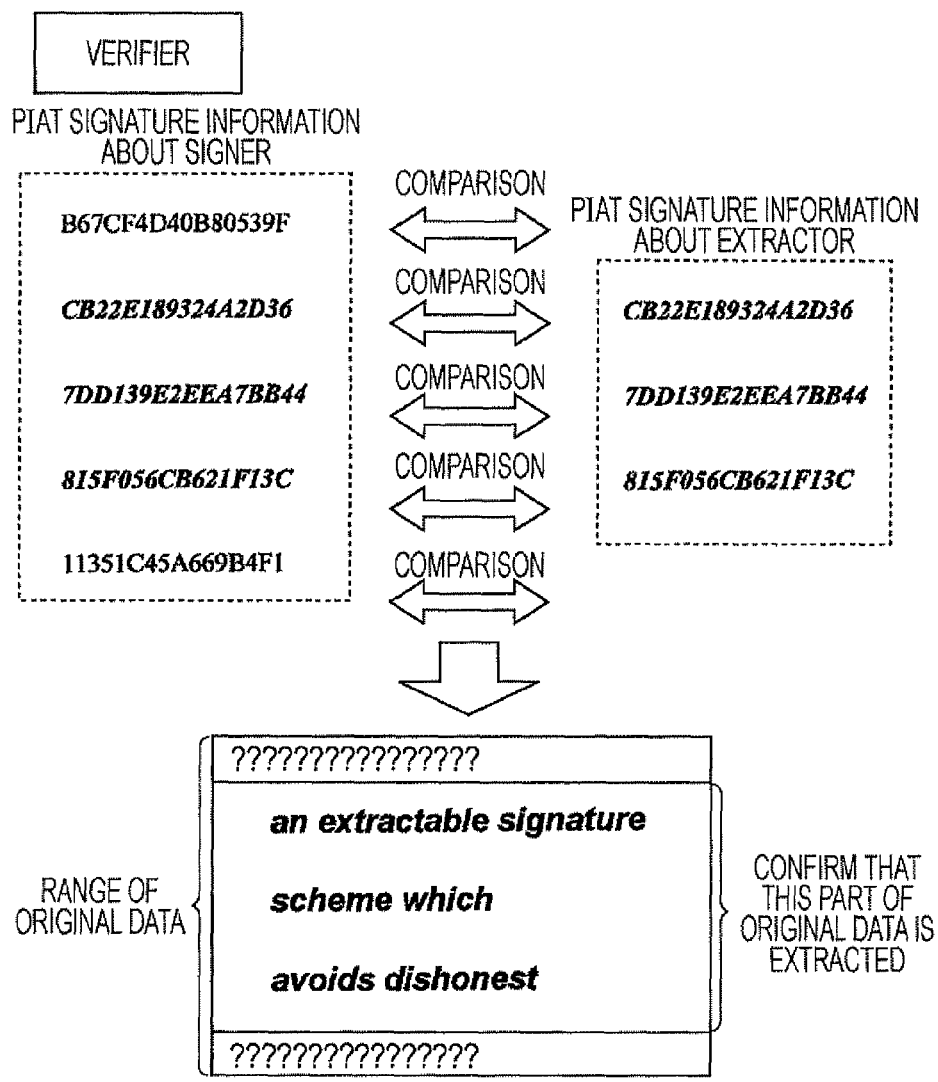
FIG. 10 illustrates an exemplary PIAT algorithm.

FIGS. 9 and 10 illustrate an exemplary PIAT algorithm.

The signer divides the signature target data into partial data items with the signer terminal 4 and calculates hash information about each partial data item to generate a collection of hash information. A digital signature of the signer may be added to the generated collection of hash information. The collection of hash information generated in the above manner is integrated with the digital signature to generate PIAT signature information about the signer.

The extractor extracts an arbitrary partial data item from the data to which the PIAT signature information may be added by the signer with the extractor terminal 6 (deletes the remaining data excluding the partial data item). Here, the extractor terminal 6 corresponds to extracting means. Then, the extractor performs an operation similar to that of the signer to generate PIAT signature information about the extractor.

The verifier verifies the integrity of the collection of hash information in the PIAT signature information to which the digital signature of the signer and the digital signature of the extractor are added with the verifier terminal 8. Then, the verifier generates a collection of hash information from the indicated partial data item and verifies whether the generated collection of hash information coincides with the collection of hash information included in the PIAT signature information about the extractor. Finally, the verifier compares the collection of hash information about the signer with the collection of hash information about the extractor to determine that the common part in the hash information is extracted from the original data. If the hash information in the extracted data is not included in the hash information for the PIAT signature information about the signer, the verifier determines that the partial data item is tampered.

Streaming data to be processed in an exemplary embodiment will now be described and defined. The streaming data is known as data concerning at least either of video and audio. The streaming data is exemplified by motion picture data here. Typical formats of motion pictures include Moving Picture Experts Group 1 (MPEG1), MPEG2, and MPEG4. Typical audio formats include MPEG Audio Layer-3 (MP3) and WAV. In an exemplary embodiment, MPEG1 may be adopted.

Although the various MPEG1 formats are used, application to motion pictures including relatively simple videos is described in an exemplary embodiment. In addition, application to motion picture data that is an elementary stream (ES) is described for simplicity. The ES is targeted at Video frames of the MPEG1 format excluding audio parts, adopts a constant bit rate (CBR), and processes only images encoded according to the MPEG1. The above format of data to be processed in an exemplary embodiment is simply referred to as MPEG1.

Figure 11:
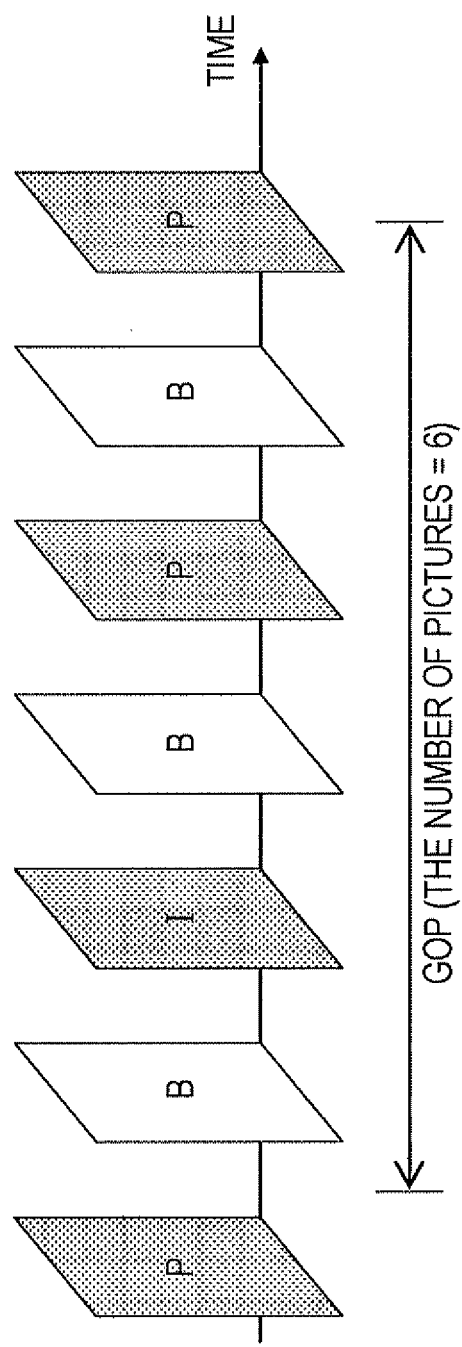
FIG. 11 illustrates exemplary image types of frames composing streaming data adopting MPEG1 as the data format and an example of the arrangement.

The MPEG1 is a motion picture encoding technology standardized in International Organization for Standardization (ISO)/International Electrotechnical Commission (IEC) 11172-2. Motion pictures may be realized by switchingly displaying still images at a relatively high speed. For example, about thirty images are displayed per second in television broadcasting and the number of images displayed per second is called a frame rate. Compression of (still) images by encoding and compression by interframe prediction coding are performed in the motion picture encoding technology in order to decrease the amount of data. The MPEG1 adopts a Discrete Cosine Transform (DCT) technology for the compression of still images and a bidirectional prediction technology for the interframe prediction. The MPEG1 holds still images by three methods for the bi-directional prediction. FIG. 11 illustrates exemplary image types of frames composing the streaming data adopting the MPEG1 as the data format and an example of the arrangement.

Referring to FIG. 11, an intra-frame (I frame) holds all the image data necessary for display in a compressed state. A predicted-frame (P frame) is called an interframe prediction image and holds only a value, such as a difference between the corresponding P frame and the I frame or P frame that is decoded most recently and that is used as a reference image. A bi-directional frame (B frame) holds a value, such as a difference between the previous I frame or P frame and the subsequent I frame or P frame that are decoded most recently and that are used as reference images. In the P frame and B frame, the difference between the corresponding frame and the previous or subsequent frame is calculated to decrease the temporal redundancy, thus realizing higher compression rate. In addition, in the MPEG1, several images (frames) are combined to compose a data group called a group of pictures (GOP), as shown in FIG. 11. The GOP is a minimum unit in which a motion picture can be played back. The GOP can be independently played back, and the use of the GOP allows a motion picture to be played back or edited from an intermediate point.

Figure 12:
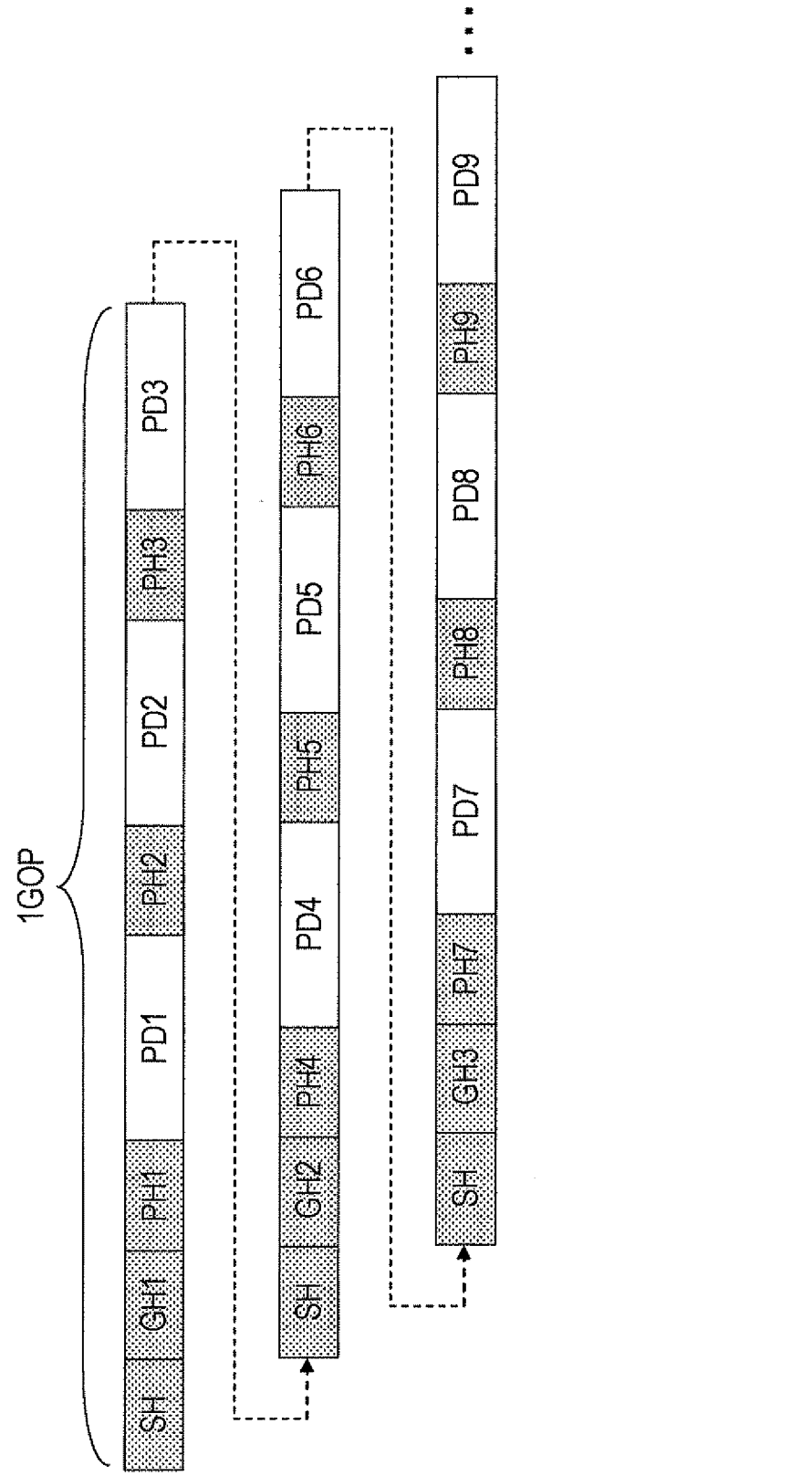
FIG. 12 illustrates an exemplary frame configuration in the MPEG1.

FIG. 12 illustrates an exemplary frame configuration in the MPEG1. Each video frame in the MPEG1 includes sequence headers (hereinafter referred to as SHs), GOP headers (hereinafter referred to as GHs), picture headers (hereinafter referred to as PHs), and picture data (hereinafter referred to as PD). The picture data means data in the layers below the picture header. Each SH serves as header information necessary for playback of each GOP. Particularly, common parameters across the video sequence, such as information indicating the size of the images in the frame, the number of frames to be encoded per second, and information about the communication speed, are recorded in the SH.

FIGS. 13 to 16 illustrate an exemplary application of the PIAT to the MPEG1 in the system according to an exemplary embodiment.

The application of the PIAT to the MPEG1 in the system according to an exemplary embodiment will now be described, taking three operators including the signer, the extractor, and the verifier as examples. The signer adds a signature to target original motion picture information. The extractor extracts (cut outs) motion picture information from the original motion picture information. The verifier verifies cutout motion picture information that is indicated.

The following conditions may be set for the signer, the extractor, and the verifier. The signer adds a signature to the original motion picture information to assure the content of the original motion picture information to which the signature is to be added. It is necessary for the signer to add the signature to the original motion picture information under a condition in which the signer does not know which part in the target original motion picture information is extracted. The extractor partially extracts data from the original motion picture information to which the signer adds the signature to indicate the extracted data as cutout motion picture information to the verifier. The data can be extracted by explicit extraction in which information about the extractor is concurrently indicated to explicitly indicate who has performed the extraction or by anonymous extraction in which the extractor anonymously performs the extraction.

In an exemplary embodiment, explicit extraction may be performed. The verifier verifies whether the indicated cutout motion picture information is assured by the signer. The verifier verifies whether the indicated cutout motion picture information is part of the original motion picture information to which the signer adds the signature and whether the extraction of the cutout motion picture information may be performed by the extractor. It is also assumed that each apparatus performs the digital signature process described above.

Figure 13:
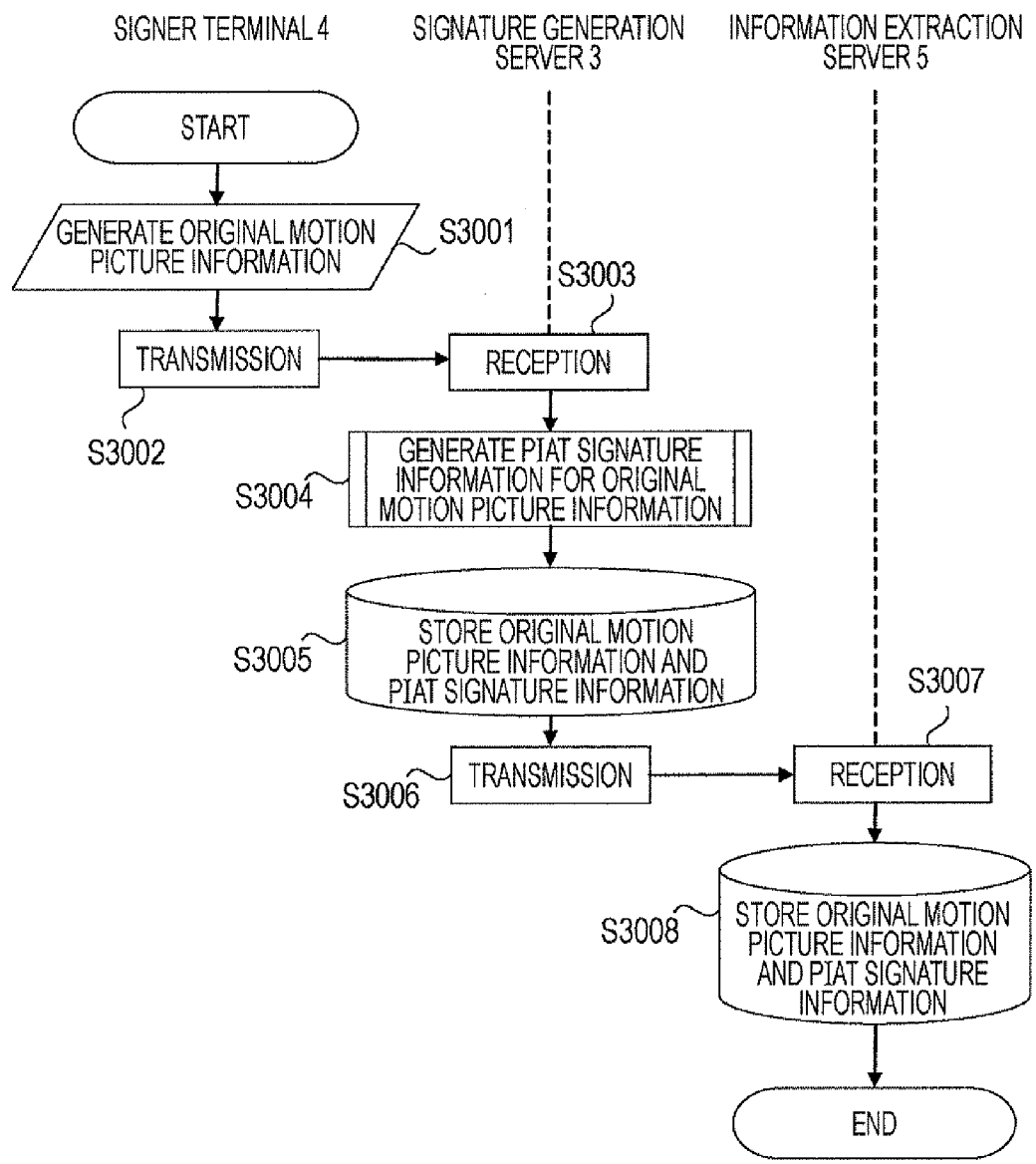
FIG. 13 illustrates an exemplary application of the PIAT to the MPEG1 in the system according to an exemplary embodiment.

Referring to FIG. 13, in Operation S3001, the signer generates original motion picture information to which a signature may be added with the signer terminal 4. When the generation of the original motion picture information is completed, in Operation S3002, the signer transmits the generated original motion picture information to the signature generation server 3. In Operation S3003, the signature generation server 3 receives the original motion picture information. The signature generation server 3 (corresponding to dividing means and binary-tree generating means) divides the original motion picture information into partial information items. When the data in the MPEG1 is divided into partial information items so as to extract the data, the extraction can be restricted because the interframe prediction technology is used and there is no independency for every PD. Accordingly, in an exemplary embodiment, in the frame configuration shown in FIG. 12, each frame starts with the SH, the frames to the PD immediately before the next SH (or the next GH if no SH exists) are made one GOP (partial data in the MPEG1), and the division into the partial data items may be performed in units of GOPs for simplicity. The signature generation server 3 divides the original motion picture information into multiple partial data items each including at least one GOP in the above manner.

In the case of motion pictures having longer recording times or motion pictures having higher frame rates (the number of frames or GOPs is large), the amount of data in the collection of hash information included in the PIAT signature information can be increased. In order to resolve this problem, for example, the hash information can be managed in binary trees to decrease the amount of data related to the signature. The PIAT algorithm is adopted for this reason. I In an exemplary embodiment, continuous motion pictures in one section among the entire data may be cut out so that the motion picture data can be extracted.

Figure 17:
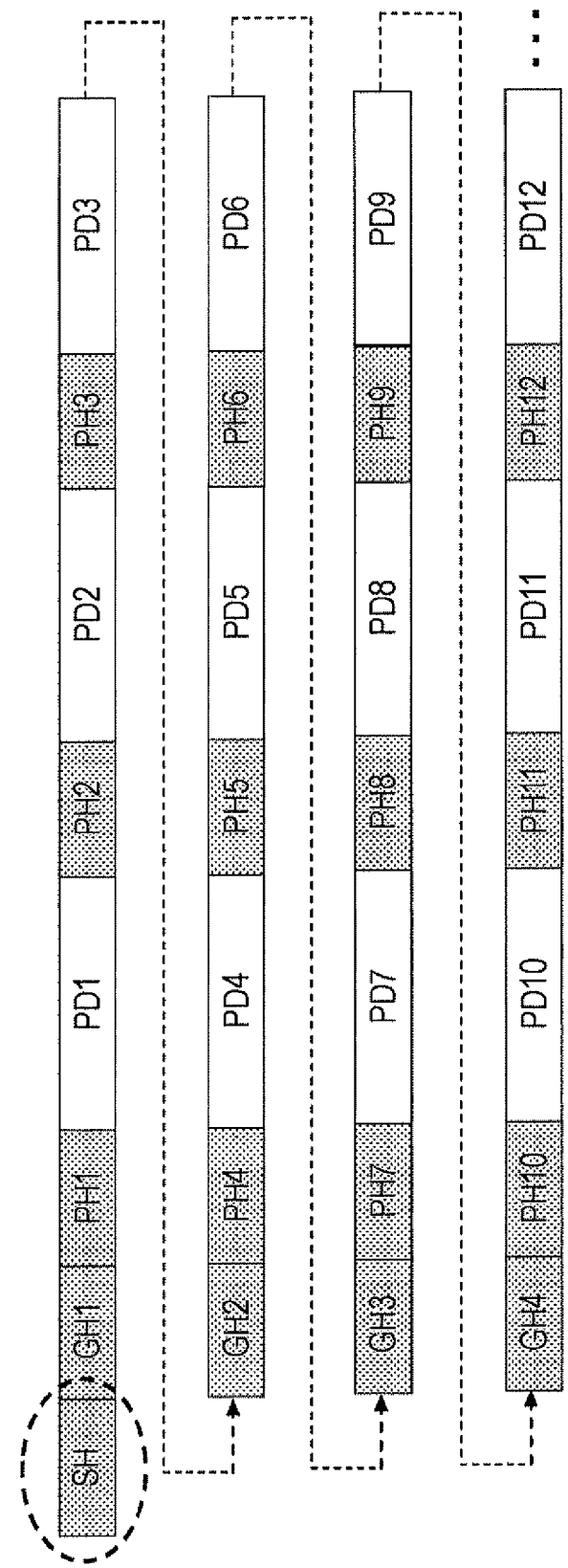
FIG. 17 illustrates generation of PIAT signature information by a signature generating part.
Figure 18:
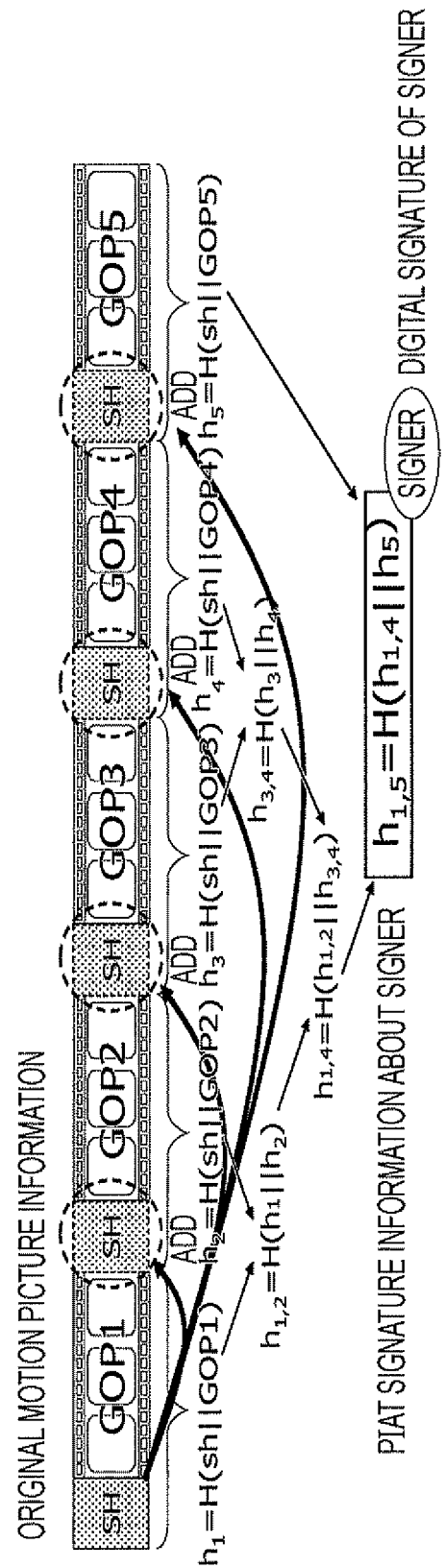
FIG. 18 illustrates an exemplary generation of the PIAT signature information by the signature generating part.

The signature generating part 33 in the signature generation server 3 generates PIAT signature information for the original motion picture information. FIGS. 17 and 18 a illustrate a generation of the PIAT signature information by the signature generating part 33.

When motion picture data from which a partial data item is cut out has a frame configuration shown in FIG. 17, it is necessary to add the content of a closest SH to GOPs to which no SH may be added to generate the hash information including the SH because it is unknown which partial data item is cut out when the signature may be added to the original motion picture information. The SH may be added to the GOP for processing and the SH is not added to the entity of the original motion picture information.

The signature generation server 3 (corresponding to output-value-sequence generating means) divides the original motion picture information into partial information items (GOPs) to calculate hash information (an output value sequence) of each GOP. At this time, the PIAT signature information for the original motion picture information serves as verification information used by the verifier to confirm whether the data to be cut out is part of the original motion picture information and is not altered. Accordingly, root hash information included in the PIAT signature information for the original motion picture information may be generated in a state where the SHs are added to all the GOPs.

In addition, the signature generating part 33 adopts a method in which a binary tree having leaves includes only hash information generated for each of the multiple partial data items may be generated and the hash information is managed by using the binary tree to generate one piece of root hash information (an output value indicating the root of the binary tree). This method is common in encryption systems. Then, in Operation S3004 in FIG. 13, the signature generating part 33 generates a digital signature of the signer for the generated root hash information and integrates the root hash information with the digital signature to generate the PIAT signature information about the signer. The signature generating part 33 at this time corresponds to digital-signature generating means. FIG. 19 illustrates a PIAT signature information about the signer.

In the example shown in FIG. 19, the root hash information is recorded as the verification information for the original motion picture information. An MD5 hash function is used as the cryptologic one-way hash function in the generation of the root hash information and the root hash information is recorded in 16 bytes (denoted by "PIAT1" in FIG. 19). The digital signature of the signer for the verification information is denoted by "SIGN1" in FIG. 19. Although the verification information for the original motion picture information and the digital signature of the signer are integrally recorded as the PIAT signature information, the verification information for the original motion picture information may be recorded and managed separately from the digital signature.

When the generation of the PIAT signature information for the original motion picture information is completed, then in Operation S3005 in FIG. 13, the signature generating part 33 stores a pair of the original motion picture information and the PIAT signature information in the document management database 31 through the document management table 32 in the signature generation server 3. In Operation S3006, the signature generation server 3 transmits the original motion picture information and the PIAT signature information to the information extraction server 5 through the a communicator 34. In Operation S3007, the information extraction server 5 receives the original motion picture information and the PIAT signature information through the a communicator 55. In Operation S3008, the information extraction server 5 stores a pair of the original motion picture information and the PIAT signature information in the document management database 51 through the document management table 52 in the information extraction server 5.

The extractor receives a notification of completion of the generation of the original motion picture information from the signer through any transmitting means and starts a process of cutting out the original motion picture information. This process may be performed, for example, when only a necessary part of the original motion picture information is extracted and indicated in response to a request to indicate the original motion picture information from a third party. This process may be performed when part of the original motion picture information is cut out because privacy information is included in the original motion picture information.

Figure 14:
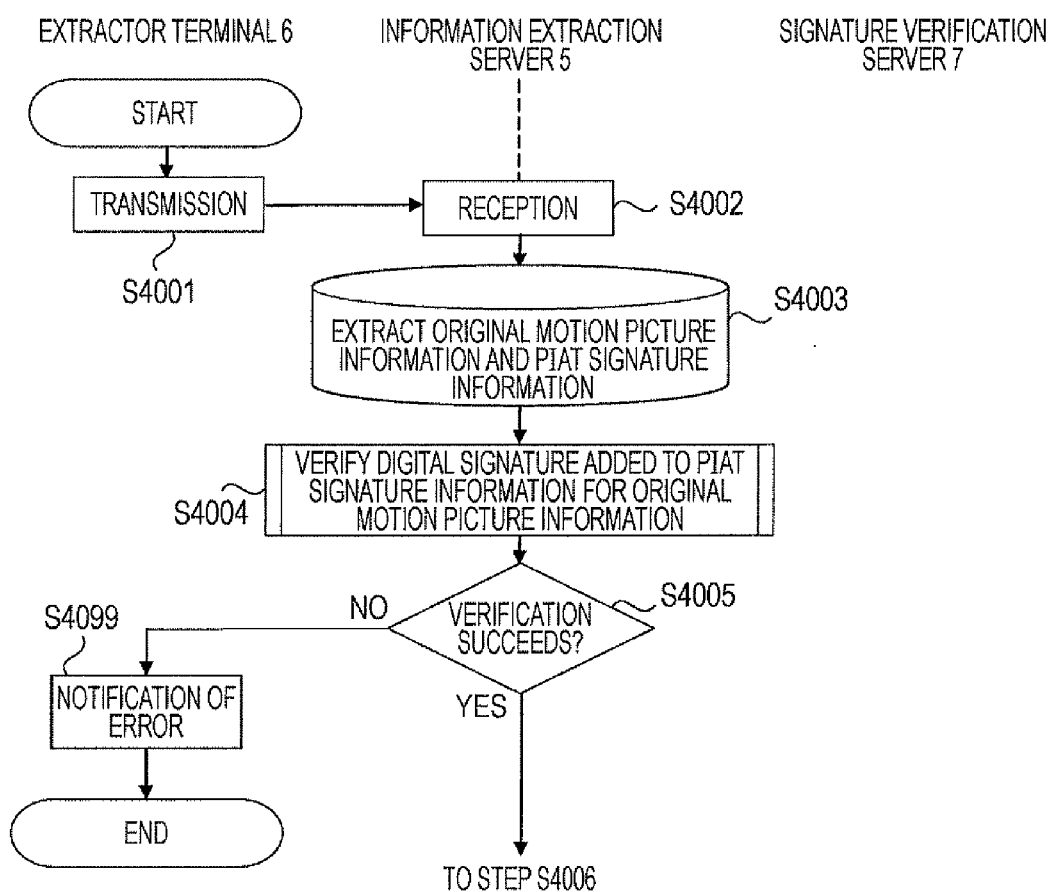
FIG. 14 illustrates an exemplary application of the PIAT to the MPEG1 in the system according to an exemplary embodiment.

Referring to FIG. 14, in Operation S4001, the extractor uses the extractor terminal 6 to transmit an instruction to extract the original motion picture information to be cut out to the information extraction server 5. In Operation S4002, the information extraction server 5 receives the instruction to extract the original motion picture information to be cut out. In Operation S4003, the information extraction server 5 extracts the original motion picture information to be cut out and the PIAT signature information, which are stored in the document management database 51, through the document management table 52. In Operation S4004, the information extraction server 5 verifies the digital signature added to the PIAT signature information through the signature verifying part 54.

In Operation S4005, the information extraction server 5 determines whether the verification of the digital signature succeeds. If the verification of the digital signature fails (the determination in Operation S4005 is negative), then in Operation S4099, the information extraction server 5 determines that the original motion picture information is altered and indicates that the original motion picture information is altered to the extractor. If the verification of the digital signature succeeds (the determination in Operation S4005 is affirmative), then in Operation S4006 in FIG. 15, the information extraction server 5 transmits the original motion picture information to the extractor terminal 6. In Operation S4007, the extractor terminal 6 receives the original motion picture information. The extractor terminal 6 displays the original motion picture information in a display device (refer to FIG. 20) of the extractor terminal 6. In Operation S4008, the extractor terminal 6 extracts a necessary part from the original motion picture information to generate cutout motion picture information.

Figure 20:
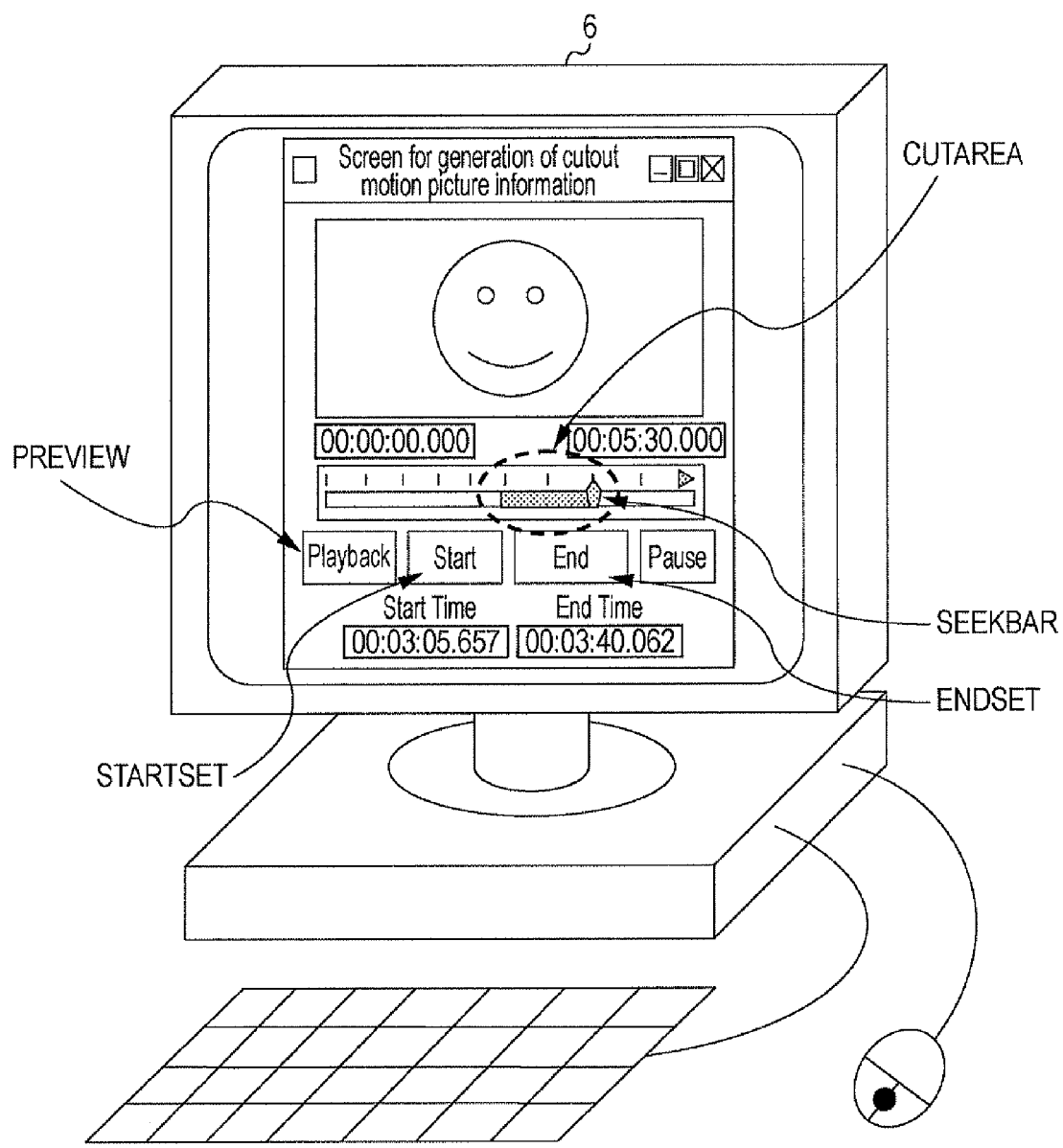
FIG. 20 illustrates an exemplary n operation of extracting original motion picture information by an extractor.

FIG. 20 illustrates an exemplary operation of extracting original motion picture information by the extractor. The extractor specifies a necessary cutout range while operating a "Playback" button (denoted by PREVIEW in FIG. 20) on the extractor terminal 6 to play back the cutout motion picture information. In other words, the extractor can visually cut out a partial data item. In the cutout of the original motion picture information, the extractor presses a Start button (denoted by STARTSET in FIG. 20) when a Seek bar (denoted by SEEK-BAR in FIG. 20) is at an arbitrary position to set a cutout start position. Then, the extractor presses an End button (denoted by ENDSET in FIG. 20) when the Seek bar (denoted by SEEKBAR in FIG. 20) is at an arbitrary position to set a cutout end position. Since the above operations determines the cutout range (denoted by CUTAREA in FIG. 20), the extractor selects a generation menu of the cutout motion picture information to generate the cutout motion picture information.

Although the SHs are added to the heads of all the GOPs in the frame configuration according to MPEG1 shown in FIG. 12, the SHs are not necessarily added to all the GOPs. Accordingly, another frame configuration may be adopted in which the SH may be added only to the first GOP (GH1) and the SHs are not added to the subsequent GOPs.

When the GOP starts with the SH, the SH can be detected to recognize the start of the GOP. Even when no SH may be added to the GOP and the GOP starts with the GH, the GH can be detected to recognize the start of the GOP. However, in consideration of the partial cutout for privacy protection, application of the MPEG1 having the frame configuration shown in FIG. 17 causes a slight problem. In the frame configuration shown in FIG. 17, when the cutout operation may be performed at any of the GOP headers GH2, GH3, and GH4, the cutout motion picture may not be played back. This is because the addition of the SH to the first GOP (GH1) of the streaming data is defined in the MPEG1 for assurance of the playback operation.

Figure 21:
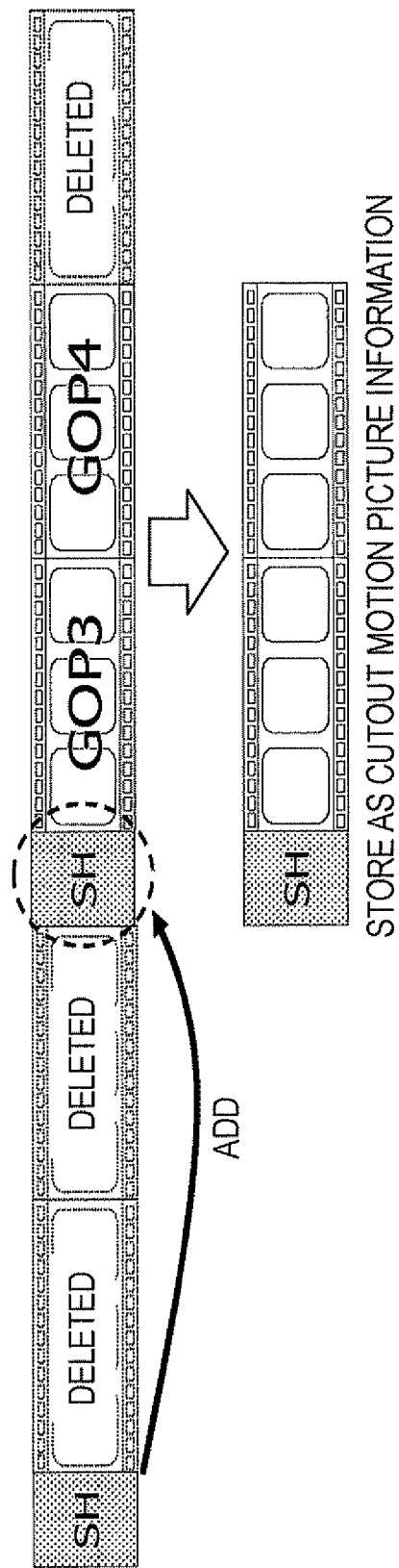
FIG. 21 illustrates processing of an SH when a motion picture is cut out from the original motion picture information.

In order to avoid the state where the cutout motion picture cannot be played back, first, the content of a closest SH may be added to the GOP (at least the first GH) to which no SH may be added to generate the cutout motion picture information including the SH (refer to FIG. 21). At this time, the SH may be added to the entity of the cutout motion picture information to avoid the state where the cutout motion picture cannot be played back. The GOP3 and GOP4 are cutout together in the example shown in FIG. 21. This is because the cutout motion picture information can be played back if the SH may be added to at least the first GOP (the data group positioned at the head of a partial data item) and the SH is not necessarily added to the GOP4 in consideration of a reduction in the amount of data of the cutout motion picture information.

Referring back to FIG. 15, when the generation of the cutout motion picture information is completed in the extractor terminal 6, then in Operation S4009, the extractor terminal 6 transmits the generated cutout motion picture information to the information extraction server 5. In Operation S4010, the information extraction server 5 receives the cutout motion picture information. The signature generating part 53 in the information extraction server S generates PIAT signature information for the cutout motion picture information.

Figure 22:
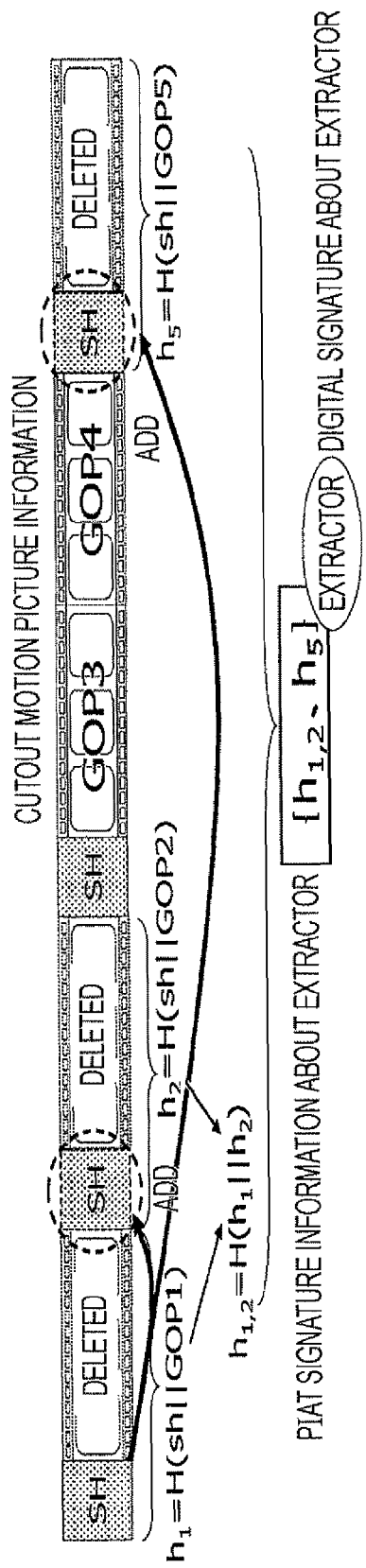
FIG. 22 illustrates generation of a deleted root hash information list.

The signature generating part 53 generates multiple pieces of root hash information including hash values generated only for the GOPs to be deleted in the extraction (deleted partial data items). The multiple pieces of root hash information are hereinafter referred to as a deleted root hash information list. At this time, the signature generating part 53 adds the content of a closest SH to the GOPs including no SH in the deleted parts to create the deleted root hash information list including the SHs (refer to FIG. 22), as in the generation of the PIAT signature information for the original motion picture information. In the above manner, the signature generating part 53 extracts the binary tree concerning the deleted partial data items, having leaves includes only the hash values concerning the deleted partial data items, from the binary trees concerning the original motion picture information and outputs the output value sequence indicating the root of the binary tree, along with the extracted partial data sequence. The signature generating part 53 uses the output value sequence indicating the root of the binary tree concerning the deleted partial data items to generate the digital signature of the extractor who has extracted the partial data items.

Figure 15:
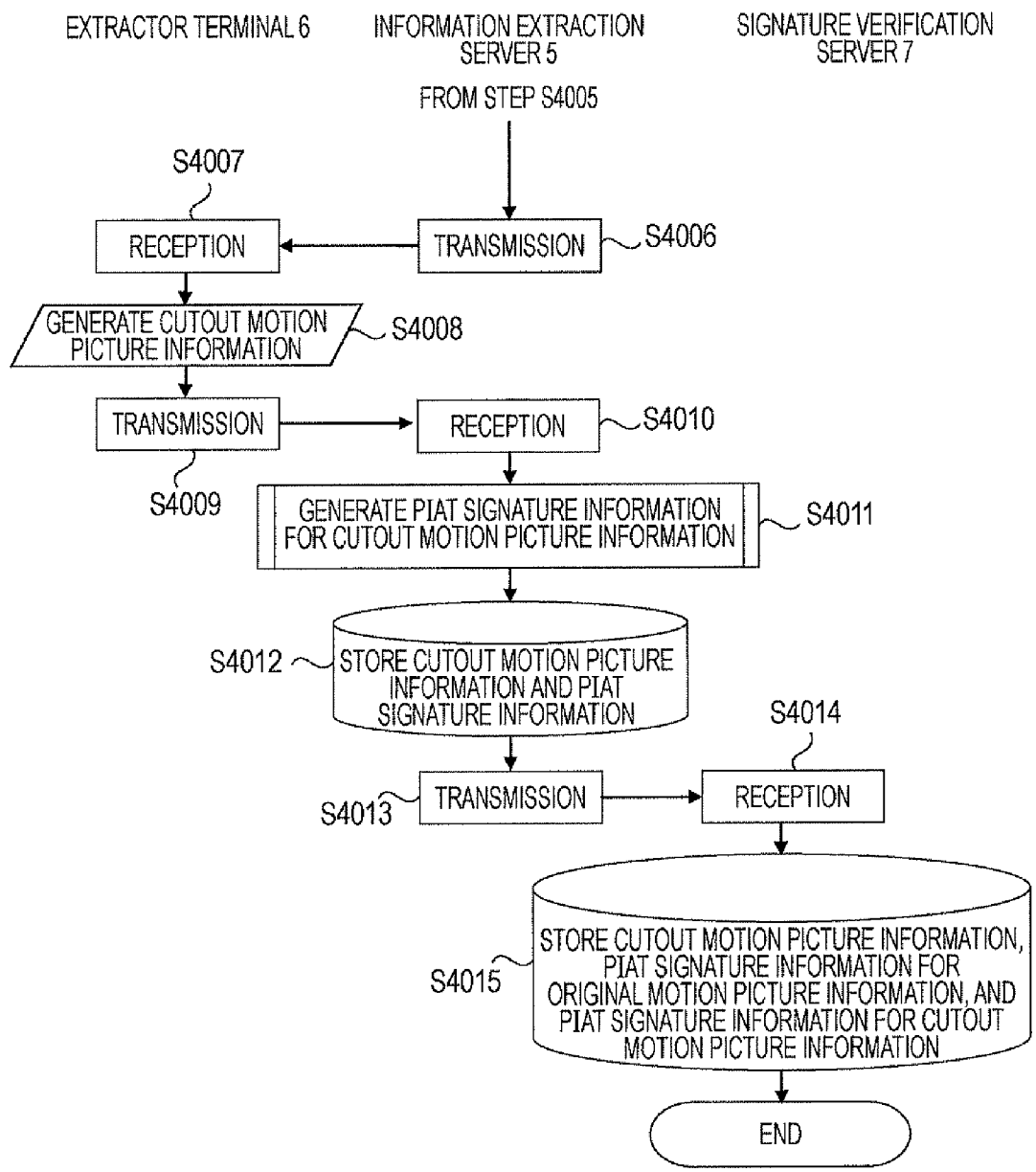
FIG. 15 illustrates an exemplary application of the PIAT to the MPEG1 in the system according to an exemplary embodiment.
Figure 23:
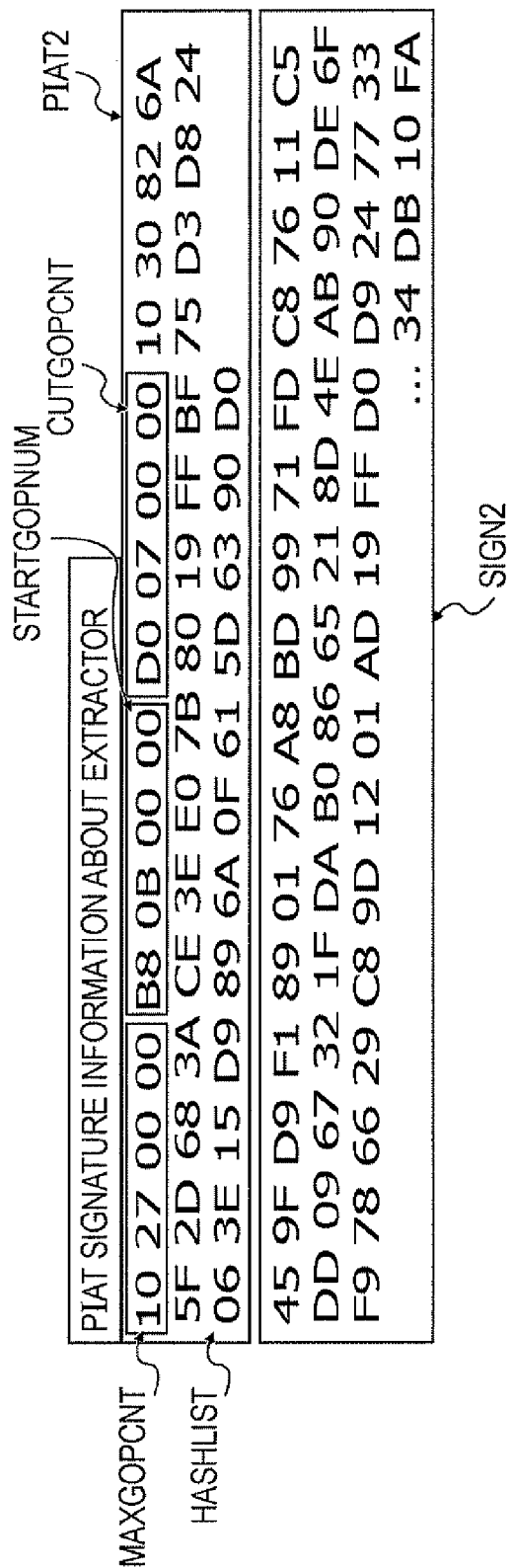
FIG. 23 illustrates a content of the PIAT signature information about the extractor.

In Operation S4011 in FIG. 15, the signature generating part 53 generates the digital signature of the extractor for the created deleted root hash information list and integrates the deleted root hash information list with the digital signature to generate the PIAT signature information about the extractor. FIG. 23 illustrates a content of the PIAT signature information about the extractor, generated by the signature generating part 53.

In the example shown in FIG. 23, the total count of GOPs in the original motion picture information (denoted by "MAXGOPCNT" in FIG. 23), the GOP number of the cutout start point (denoted by "STARTGOPNUM" in FIG. 23), the count of cutout GOPs (denoted by "CUTGOPCNT" in FIG. 23), and the deleted root hash information list (denoted by "HASHLIST" in FIG. 23) are sequentially recorded as the verification information for the cutout motion picture information. The "MAXGOPCNT", "STARTGOPNUM", "CUTGOPCNT", and "HASHLIST" are collectively denoted by "PIAT2" in FIG. 23. The digital signature of the extractor for the verification information is denoted by "SIGN2" in FIG. 23. Although the verification information for the cutout motion picture information and the digital signature of the extractor are integrally recorded as the PIAT signature information in the example shown in FIG. 23, the verification information for the cutout motion picture information may be recorded and managed separately from the digital signature.

When the generation of the PIAT signature information for the cutout motion picture information is completed, then in Operation S4012, the signature generating part 53 stores a pair of the cutout motion picture information and the PIAT signature information in the document management database 51 through the document management table 52 in the information extraction server 5. In Operation S4013, the information extraction server 5 transmits the three pieces of information including the cutout motion picture information, the PIAT signature information for the original motion picture information, and the PIAT signature information for the cutout motion picture information to the signature verification server 7 through the a communicator 55. In Operation S4014, the signature verification server 7 receives the three pieces of information including the cutout motion picture information, the PIAT signature information for the original motion picture information, and the PIAT signature information for the cutout motion picture information through the communication mean 74. In Operation S4015, the signature verification server 7 stores the three pieces of information including the cutout motion picture information, the PIAT signature information for the original motion picture information, and the PIAT signature information for the cutout motion picture information in the document management database 71 through the document management table 72.

Figure 16:
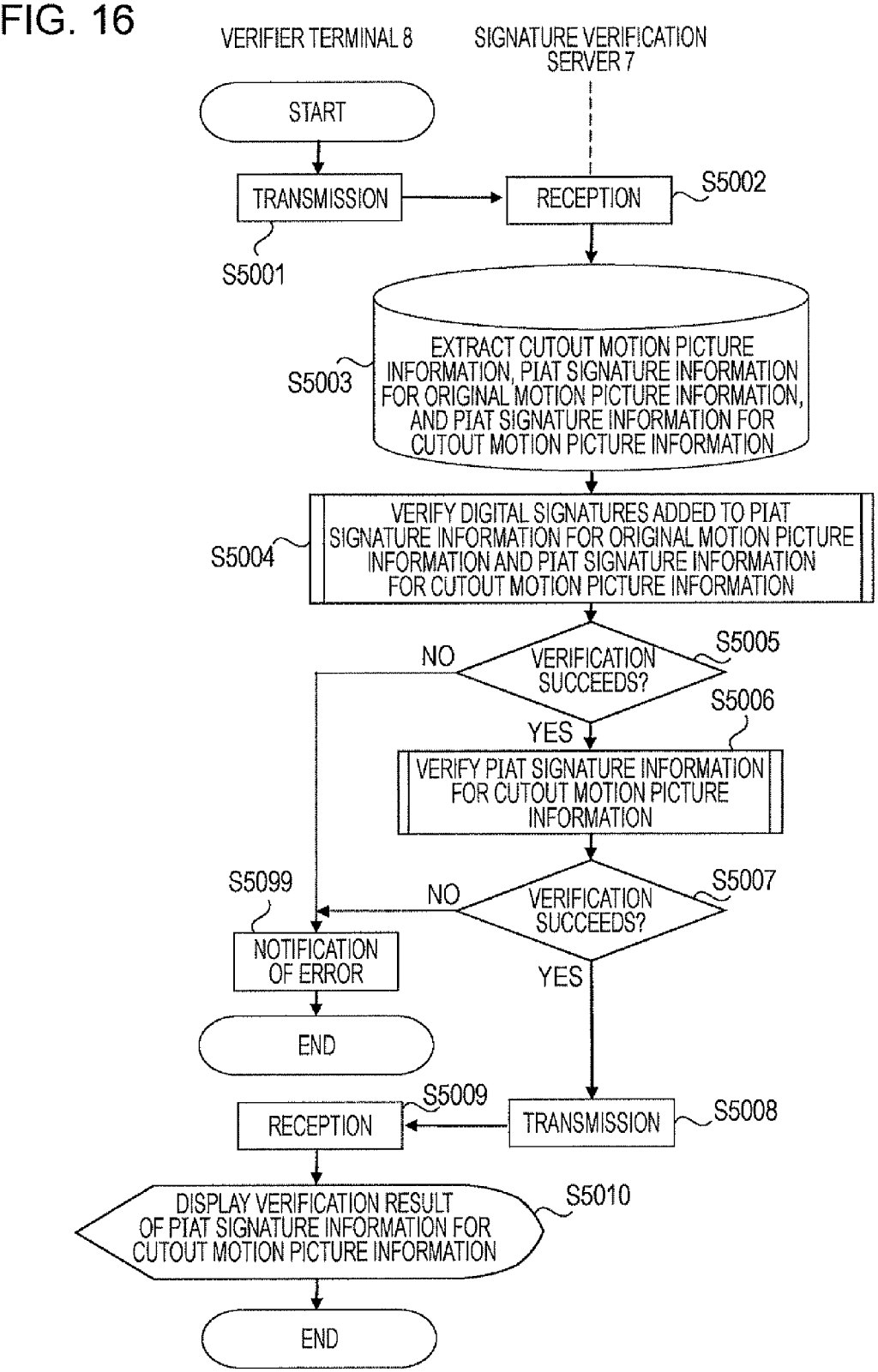
FIG. 16 illustrates an exemplary application of the PIAT to the MPEG1 in the system according to an exemplary embodiment.
Figure 24:
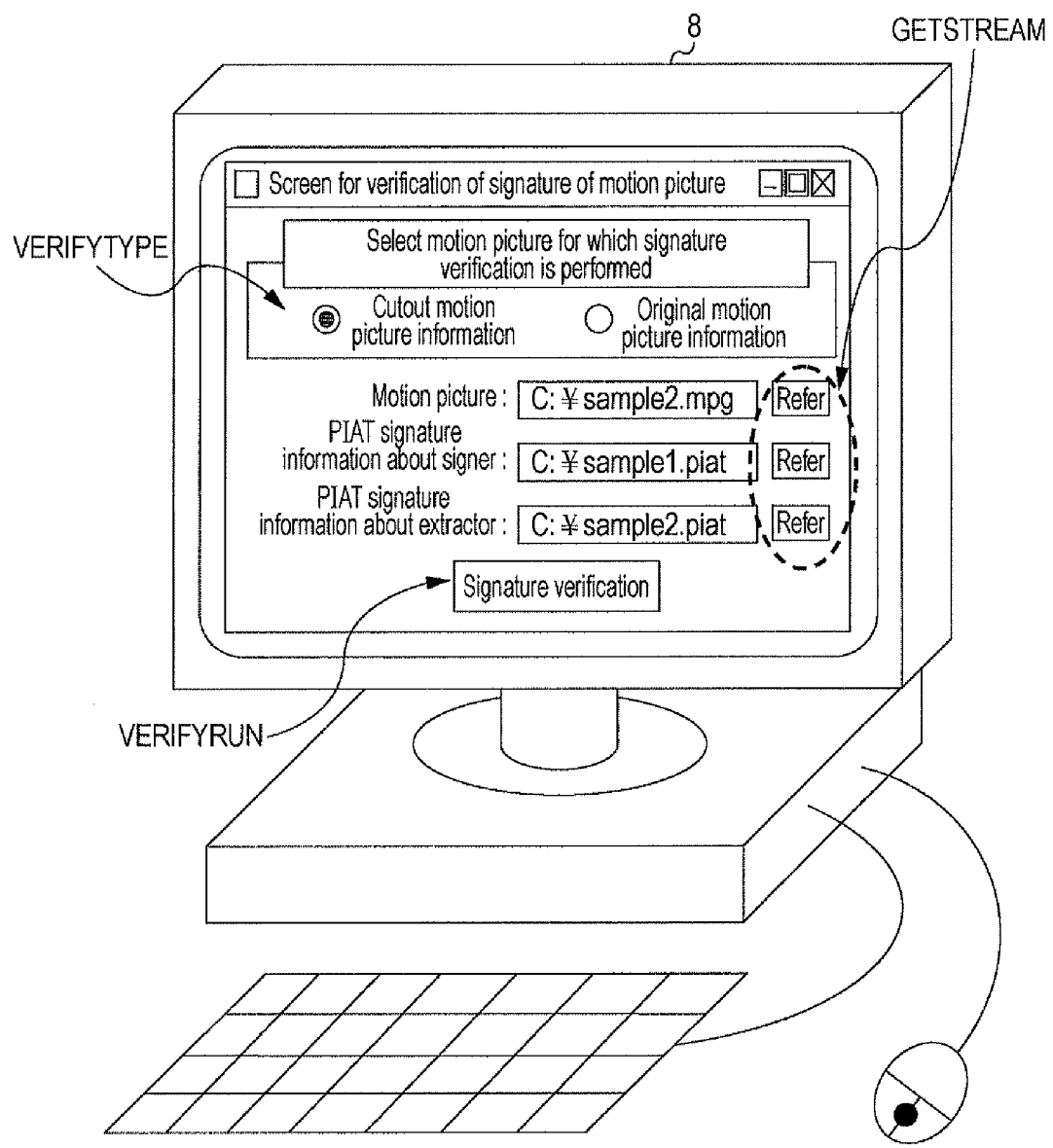
FIG. 24 illustrates an exemplary selection screen of motion picture information to be verified and verification information.

The verifier receives a notification of the indication of the cutout motion picture information from the extractor through any transmitting means and starts confirmation and verification of the indicated cutout motion picture information. Referring to FIG. 16, in Operation S5001, the verifier uses the verifier terminal 8 to transmit an instruction to extract the cutout motion picture information to be verified to the signature verification server 7. FIG. 24 illustrates an exemplary selection screen of the motion picture information to be verified and the verification information.

In the example shown in FIG. 24, the cutout motion picture information or the original motion picture information can be selected to perform the signature verification to the selected motion picture information (denoted by "VERIFYTYPE" in FIG. 24). For example, when the cutout motion picture information is selected, the cutout motion picture information, the PIAT signature information about the signer, or the PIAT signature information about the extractor can be selected by pressing a "Refer" button (denoted by "GETSTREAM" in FIG. 24) at the right of each field. Pressing the "Refer" button allows the cutout motion picture information stored in the document management database 71 in the signature verification server 7 to be referred to and selected. Pressing a "Signature verification" button (denoted by "VERIFYRUN" in FIG. 24) allows a process of verifying the signature of the selected cutout motion picture information to be performed.

Although the verifier selects the PIAT signature information about the signer or the PIAT signature information about the extractor in an exemplary embodiment, the verifier may simply select the cutout motion picture information without regard to the presence of the PIAT signature information.

For example, a list of titles with which the content of the cutout motion picture information can be easily estimated and identified may be presented to the verifier to cause the verifier to select the cutout motion picture information from the list. In this case, it is necessary to hold, for example, link information used for determining which motion picture information in the document management database 71 in the signature verification server 7 is selected from the list.

Referring back to FIG. 16, after the signature verification process may be performed, then in Operation S5002, the signature verification server 7 receives the instruction to extract the cutout motion picture information to be verified. In Operation S5003, the signature verification server 7 extracts the three pieces of information including the cutout motion picture information, the PIAT signature information for the original motion picture information, and the PIAT signature information for the cutout motion picture information stored in the document management database 71 through the document management table 72 in the signature verification server 7. In Operation S5004, the signature verification server 7 verifies the digital signatures added to the PIAT signature information through the signature verifying part 73. In Operation S5005, the signature verification server 7 determines whether the verification of the digital signatures succeeds. If the verification of the digital signatures fails (the determination in Operation S5005 is negative), then in Operation S5099, the signature verification server 7 determines that the cutout motion picture information is altered and indicates that the cutout motion picture information is altered to the verifier. If the verification of the digital signatures succeeds (the determination in Operation S5005 is affirmative), then in Operation S5006, the signature verification server 7 verifies the PIAT signature information for the cutout motion picture information.

Figure 25:
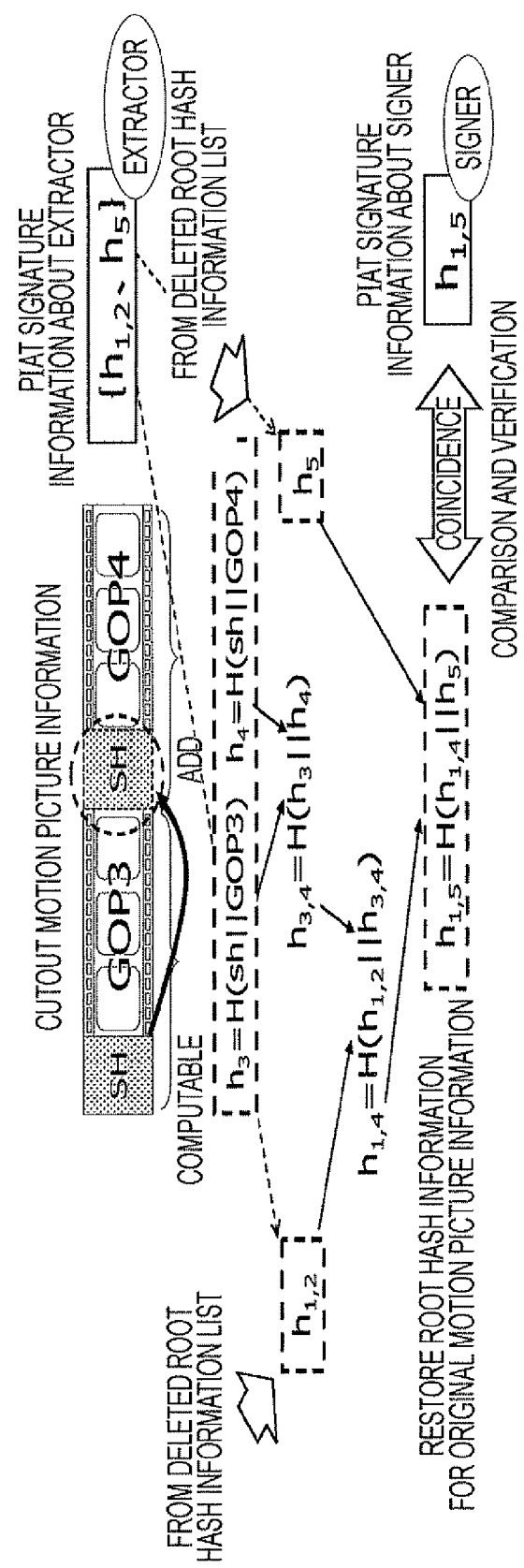
FIG. 25 illustrates restoring of root hash information for the original motion picture information.

When the two continuous partial information items, the GOP3 and GOP4, are cut out as in the example shown in FIG. 21, generation of the hash information without the SH included in the GOP4 because of the fact that the SH may not be added to the GOP4 fails to verify the PIAT signature information for the cutout motion picture information. Accordingly, the signature verification server 7 adds the content of a closest SH to the GOPs to which no SH may be added to generate the hash information including the SHs also in the verification of the PIAT signature information for the cutout motion picture information. Then, the signature verification server 7 restores the root hash information for the original motion picture information, along with the deleted root hash information list included in the PIAT signature information for the extractor, and compares the restored root hash information for the original motion picture information with the PIAT signature information about the signer to perform the verification (refer to FIG. 25).

Figure 26:
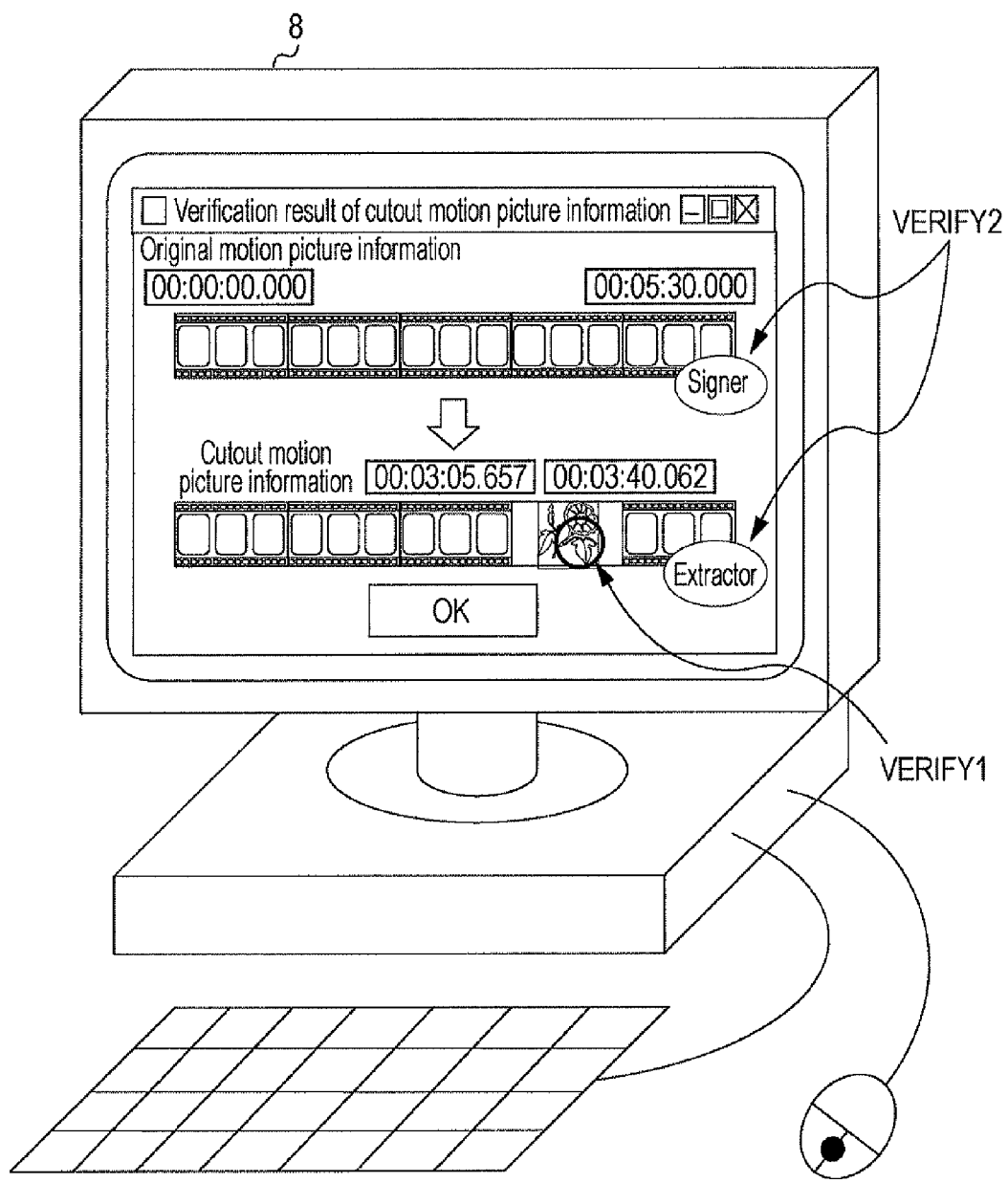
FIG. 26 illustrates a result of signature verification displayed in a display device of a verifier terminal.

Referring back to FIG. 16, in Operation S5007, the signature verification server 7 determines whether the verification of the PIAT signature information succeeds. If the verification of the PIAT signature information fails (the determination in Operation S5007 is negative), then in Operation S5099, the signature verification server 7 determines that the PIAT signature information is altered and indicates that the PIAT signature information is altered to the verifier by, for example, screen display. If the verification of the PIAT signature information succeeds (the determination in Operation S5007 is affirmative), then in Operation S5008, the signature verification server 7 transmits the result of the verification of the PIAT signature information for the cutout motion picture information to the verifier terminal 8. In Operation S5009, the verifier terminal 8 receives the result of the verification of the PIAT signature information for the cutout motion picture information. In Operation S5010, the verifier terminal 8 displays the result of the verification of the PIAT signature information for the cutout motion picture information in a display device of the verifier terminal S. FIG. 26 illustrates a result of signature verification displayed in the display device of the verifier terminal 8. The verifier can refer to the result of the signature verification to confirm that the cutout motion picture information is part of the original motion picture information. In addition, since a cutout range indicating which part in the original motion picture information is cut out and the fact that the cutout part is not altered are explicitly displayed in the display device, the verifier can confirm the originality of the cutout motion picture information (refer to "VERIFY1" in FIG. 26).

Furthermore, the verifier can confirm the digital signatures of the signer and the extractor to confirm who has generated the original motion picture information and who has cut out the original motion picture information (who has generated the cutout motion picture information) (refer to "VERIFY2" in FIG. 26).

According to an exemplary embodiment, it is possible to verify the original motion picture information. For example, when the original motion picture information is selected from the "VERIFYTYPE" in FIG. 24, the original motion picture information or the PIAT signature information about the signer (the selection of the PIAT signature information about the extractor is not necessary) can be selected by pressing the "Refer" button (denoted by "GETSTREAM" in FIG. 24) at the right of each field. Pressing the "Refer" button allows the original motion picture information stored in the document management database 71 in the signature verification server 7 to be referred to and selected. Pressing the "Signature verification" button (denoted by "VERIFYRUN" in FIG. 24) allows a process of verifying the signature of the selected original motion picture information to be performed.

Another A exemplary embodiment is described in the following. The same reference numerals are used in the second exemplary embodiment to identify the components having the same functions described above in an exemplary embodiment. A description of such components is omitted herein.

The method of managing the hash information by using the binary trees is described in an exemplary embodiment in order to reduce the amount of data in the PIAT signature information. However, when the document management database in each server has free space, the method described in International Publication 2006/008847 may be applied, instead of the method of managing the hash information by using the binary trees, to generate and record the hash information in units of GOPs included in the original motion picture information.

Figure 27:
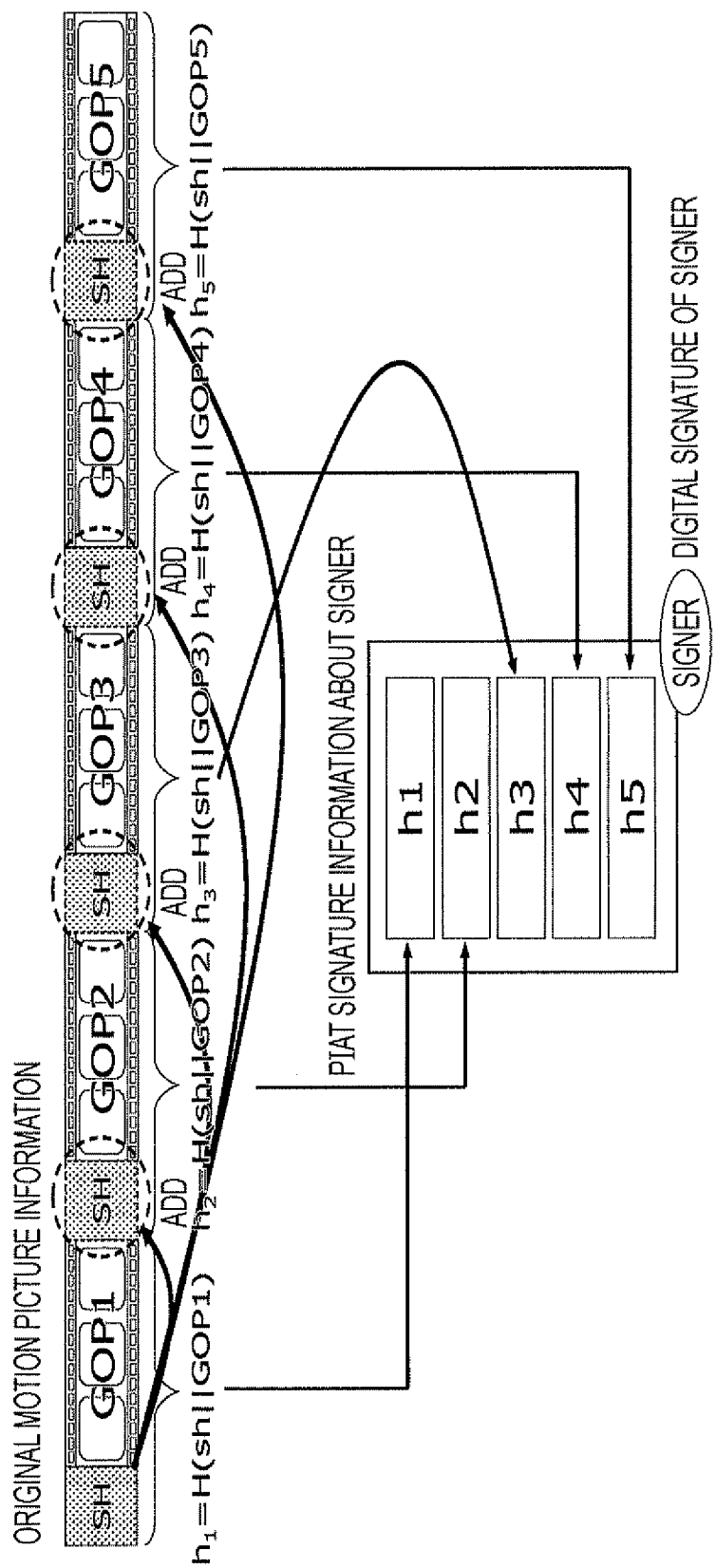
FIG. 27 illustrates generation of the PIAT signature information for the original motion picture information according to a second exemplary embodiment of the present invention.

In generation of PIAT signature information for the original motion picture information, the following process may be performed in the signature generating part 33 in the signature generation server 3. FIG. 27 illustrates the generation of the PIAT signature information for the original motion picture information according to the second exemplary embodiment.

According to the second exemplary embodiment, the original motion picture information is divided into partial information items (GOPs) and the content of a closest SH may be added to the GOPs to which no SH may be added to generate the hash information including the SHs. When the generation of the hash information for all the GOPs is completed, the signature generating part 33 combines all the hash information together. Addition and recording of information for holding the time series (ordinality) of the GOPs by the signature generating part 33 allows the information to be certified later. The signature generating part 33 generates the digital signature of the signer for the collection of the hash information for all the GOPs and integrates the collection of the hash information for all the GOPs with the digital signature to generate the PIAT signature information about the signer.

In generation of PIAT signature information for the cutout motion picture information, the following process may be performed in the signature generating part 53 in the information extraction server 5.

Figure 28:
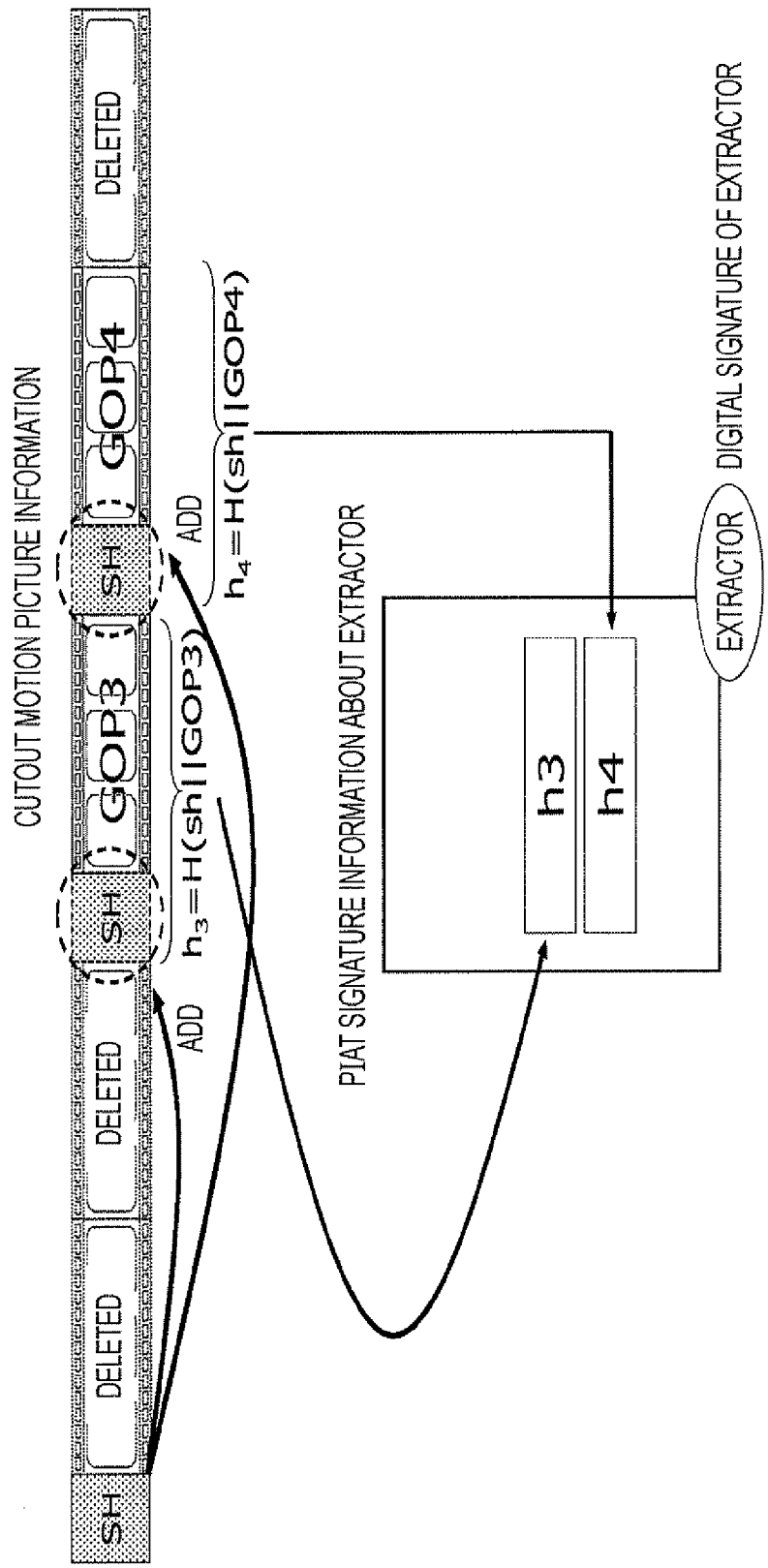
FIG. 28 illustrates generation of the PIAT signature information for cutout motion picture information according to the second exemplary embodiment of the present invention.

FIG. 28 illustrates the generation of the PIAT signature information for the cutout motion picture information according to the second exemplary embodiment. In the generation of the PIAT signature information for the original motion picture information, the original motion picture information is divided into partial information items (GOPs) and the content of a closest SH may be added to the GOPs which are to be cut out and to which no SH may be added to generate the hash information including the SHs. When the generation of the hash information for the GOPs included in the cutout partial data items is completed, the signature generating part 53 combines all the hash information together. Addition and recording of information for holding the time series (ordinality) of the GOPs by the signature generating part 53 allows the information to be certified later. The signature generating part 53 generates the digital signature of the extractor for the collection of the hash information for the cutout GOPs and integrates the collection of the hash information for the cutout GOPs with the digital signature to generate the PIAT signature information about the extractor.

Figure 29:
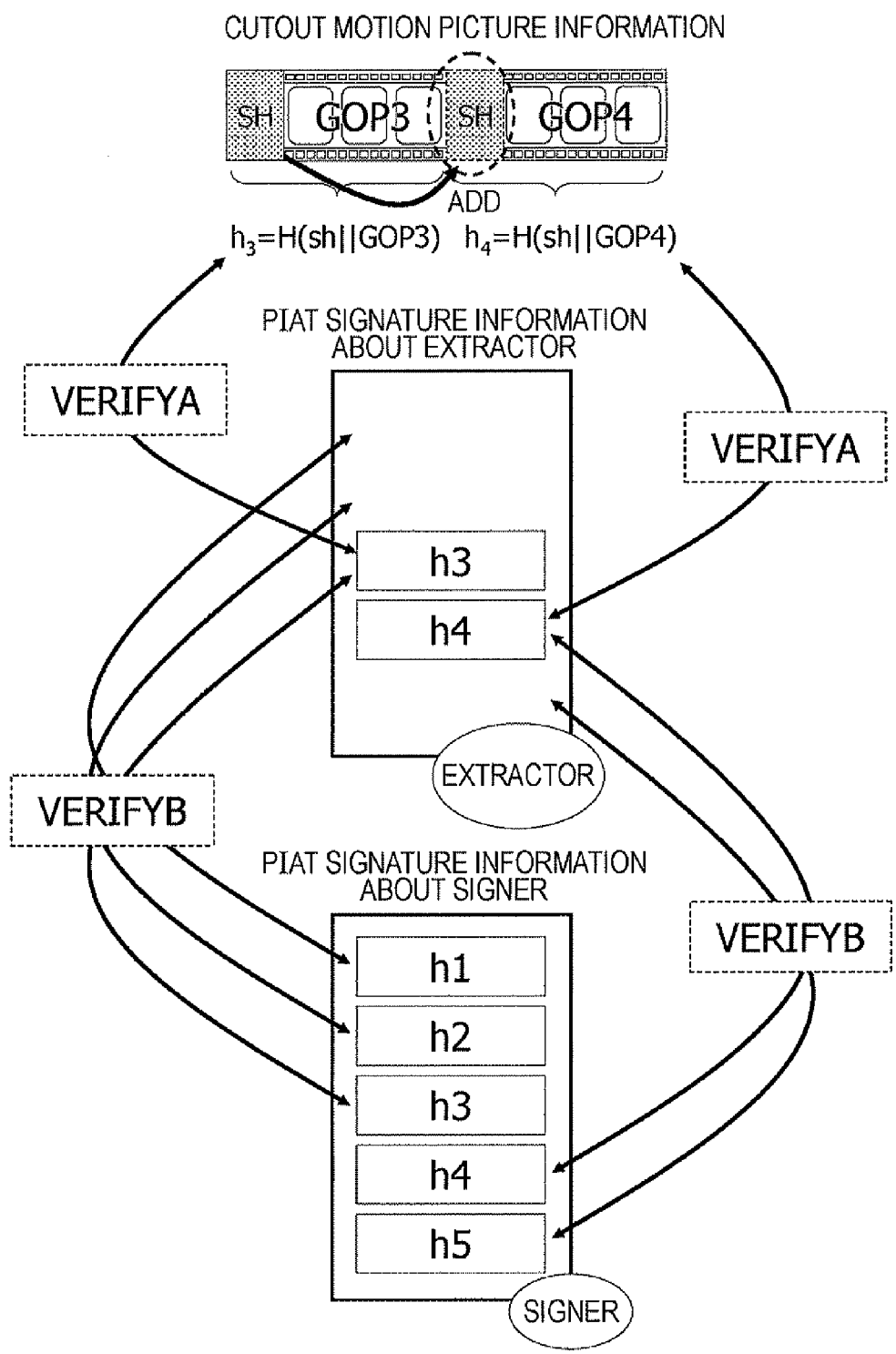
FIG. 29 illustrates an exemplary process performed in a signature verifying part in the signature verification server according to the second exemplary embodiment of the present invention.

In a signature verification process, the following process may be performed in the signature verifying part 73 in the signature verification server 7. FIG. 29 illustrates the signature verification process performed in the signature verifying part 73 in the signature verification server 7 according to the second exemplary embodiment. The signature verifying part 73 verifies the digital signature added to the PIAT signature information. If the verification of the digital signature fails, the signature verifying part 73 determines that the data to be verified is altered and indicates that the data to be verified is altered to the verifier. If the verification of the digital signature succeeds, the signature verifying part 73 verifies the PIAT signature information for the cutout motion picture information.

When the signature verifying part 73 cuts out the two continuous partial information items, the GOP3 and GOP4, as in the example shown in FIG. 21, hash information can be generated without the SH included in the GOP4 because of the fact that the SH may not be added to the GOP4 and the PIAT signature information for the cutout motion picture information cannot possibly be verified. Accordingly, the signature verifying part 73 (corresponding to verification information generating means and verifying means) adds the content of a closest SH to the GOP to which no SH may be added to generate the hash information including the SH also in the verification of the PIAT signature information for the cutout motion picture information. Then, the signature verifying part 73 compares the hash information generated in the above manner with the hash information for the cutout GOPs included in the PIAT signature information about the extractor to determine whether the hash information generated in the above manner coincides with the hash information for the cutout COPs included in the PIAT signature information about the extractor (denoted by "VERIFYA" in FIG. 29). In addition, the signature verifying part 73 compares the PIAT signature information about the signer with the hash information for the cutout GOPs included in the PIAT signature information about the extractor to determine whether the cutout motion picture information coincides with the partial information items in the original motion picture information (denoted by "VERIFYB" in FIG. 29).

In the "VERIFYA" operation in the signature verification process according to the second exemplary embodiment, the coincidence between the hash information (h3 and h4) generated from the cutout motion picture information GOP3 and GOP4 and the hash information (h3 and h4) for the GOP3 and GOP4 included in the PIAT signature information about the extractor and the coincidence between the PIAT signature information about the signer and the hash information (h3 and h4) for the cutout GOPs included in the PIAT signature information about the extractor can be confirmed to certify that the pieces of the cutout motion picture information (GOP3 and GOP4) are cut out as part of the original motion picture information generated by the signer and are not altered.

Both of the method of managing the hash information by using the binary trees and the method of adopting the technology described in International Publication 2006/008847 to generate and record the hash information in units of GOPs included in the original motion picture information described in the above embodiments can achieve the effect of the PIAT signature information on the motion picture information.

A third embodiment is a modification of each embodiment of the present invention described above. The same reference numerals are used in the third exemplary embodiment to identify the components having the same functions described above in the first and second exemplary embodiments. A description of such components is omitted herein.

Although the PIAT signature information is managed separately from the motion picture information in the first and second exemplary embodiments described above, the PIAT signature information may be stored in the header of the motion picture information to integrally manage and indicate the motion picture information and the PIAT signature information. This method will now be specifically described as the third exemplary embodiment of the present invention.

Figure 30:
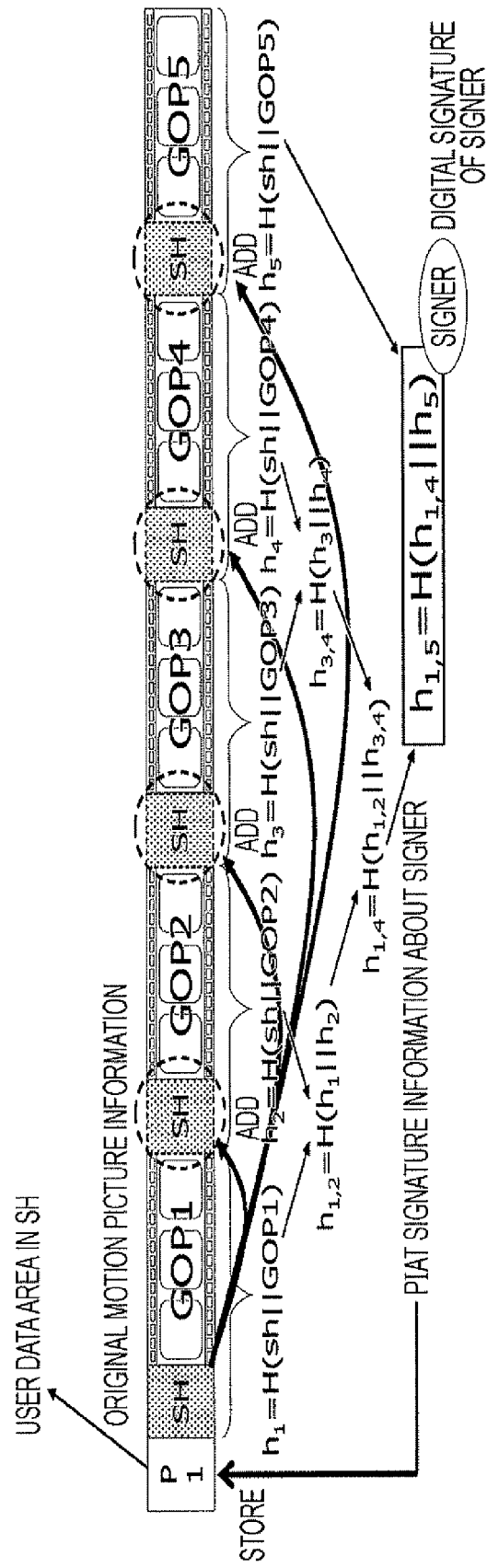
FIG. 30 illustrates generation of the PIAT signature information for the original motion picture information according to a third exemplary embodiment of the present invention.

In generation of the original motion picture information, the content of a closest SH may be added to the GOPs to which no SH may be added to generate the PIAT signature information about the signer, as in an exemplary embodiment, and the generated PIAT signature information about the signer is stored in, for example, the header (a user data area in the SH) of the original motion picture information. FIG. 30 illustrates the method of storing the original motion picture information according to the third exemplary embodiment of the present invention.

Figure 31:
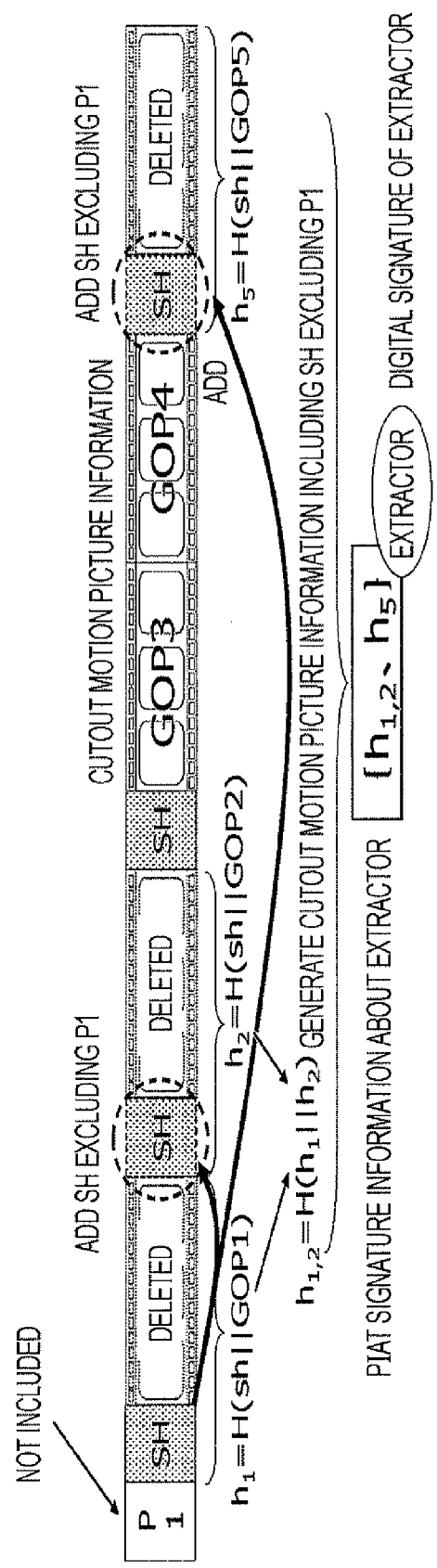
FIG. 31 illustrates generation of the PIAT signature information for the cutout motion picture information according to the third exemplary embodiment of the present invention.

In generation of the cutout motion picture information, when the content of a closest SH may be added to the GOP to which no SH may be added to generate the PIAT signature information about the extractor as in an exemplary embodiment, the stored PIAT signature information about the signer is excluded. This is because the PIAT signature information about the signer may be generated in a state where the PIAT signature information about the signer is not stored in the SH. FIG. 31 illustrates the method of generating the cutout motion picture information according to the third exemplary embodiment of the present invention.

Figure 32:
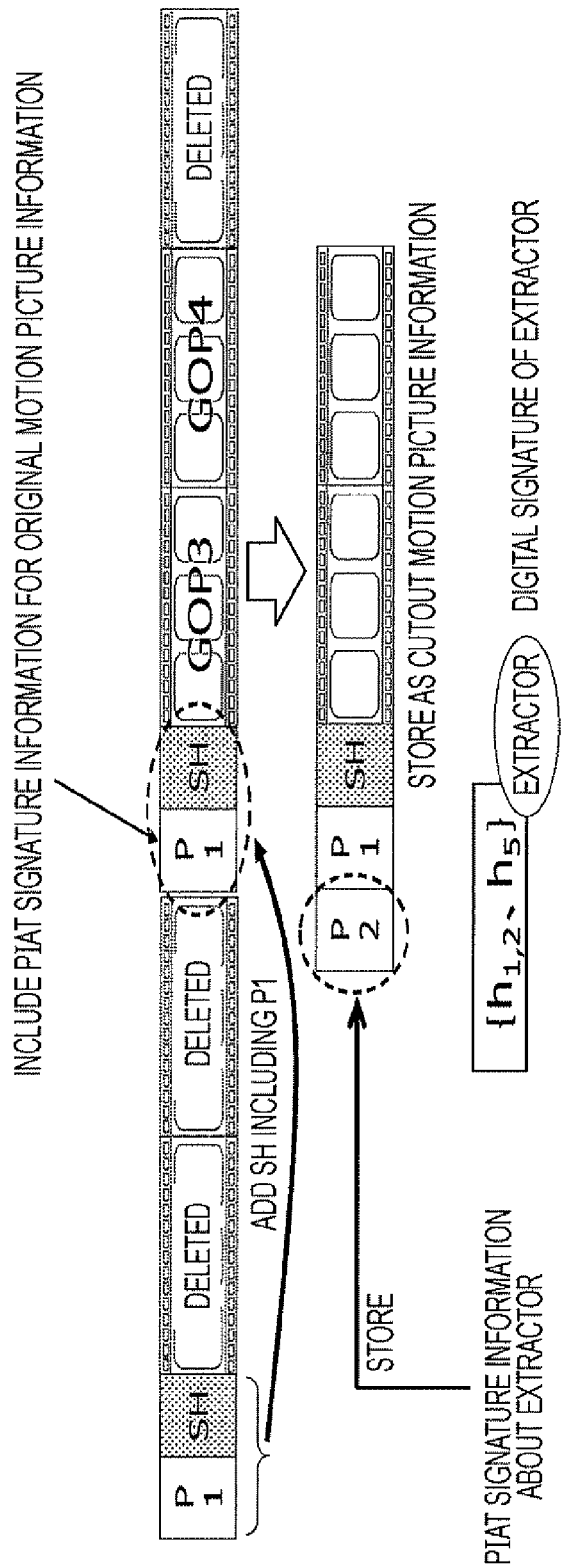
FIG. 32 illustrates generation of the cutout motion picture information according to the third exemplary embodiment of the present invention.

When the cutout motion picture information may be generated, the SH including the PIAT signature information about the signer stored in the original motion picture information may be added to the cutout motion picture information and the generated PIAT signature information about the extractor is stored in the header (the user data area in the SH) of the cutout motion picture information that has been added. At this time, the stored PIAT signature information about the signer is not overwritten with the PIAT signature information about the extractor and the PIAT signature information about the extractor may be added before or after the PIAT signature information about the signer. FIG. 32 illustrates the method of generating and storing the PIAT signature information about the extractor according to the third exemplary embodiment of the present invention. In indication of the information, one piece of the cutout motion picture information in which the PIAT signature information about the signer and the PIAT signature information about the extractor are stored is indicated.

Figure 33:
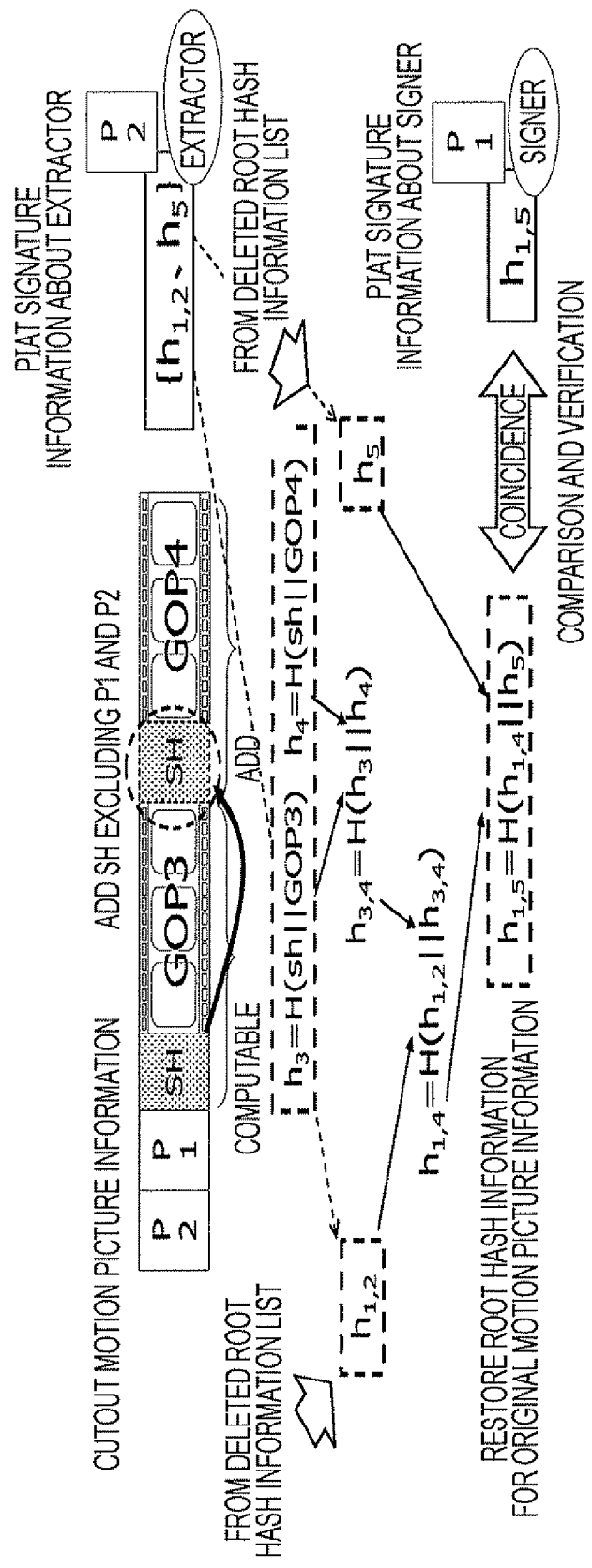
FIG. 33 illustrates signature verification for the cutout motion picture information according to the third exemplary embodiment of the present invention.

Finally, in verification of the cutout motion picture information, when the content of a closest SH is added to the GOPs to which no SH is added and the root hash information for the original motion picture information is restored as in an exemplary embodiment, the PIAT signature information about the signer and the PIAT signature information about the extractor stored in the header (the user data area in the SH) of the cutout motion picture information are excluded. This leads to the coincidence between the restored root hash information for the original motion picture information and the stored PIAT signature information about the signer. FIG. 33 illustrates a verification method according to the third exemplary embodiment of the present invention.

As described above, according to the third exemplary embodiment of the present invention, the PIAT signature information is stored in the header (the user data area in the SH) of the cutout motion picture information to indicate one piece of the cutout motion picture information. In other words, since the cutout motion picture information can be carried with the PIAT signature information necessary for the verification, it is not necessary to associate the motion picture information with the PIAT signature information in the management and indication and it is also not necessary to manage the PIAT signature information in the original server or the like. Accordingly, it is possible to further reduce the management, indication, and distribution costs, compared with the case where the PIAT signature information is managed separately from the motion picture information as described in the first and second exemplary embodiments.

According to the exemplary embodiments described above, even when part of the original motion picture information is cut out for, for example, privacy protection, it is possible to detect the cutout part (position) and to verify the originality of the cutout motion picture information while avoiding the situation in which the cutout motion picture information cannot be played back.

Since the extractor can be identified from the digital signature in the PIAT signature information, it is possible to track the operation of the extractor even if the extractor alters the cutout motion picture information or adds something to the cutout motion picture information.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method, comprising:
dividing streaming data into multiple partial data items;
generating a plurality of information based on the multiple partial data items, the plurality of information respectively indicating a characteristic of a corresponding partial data item;
first associating a first digital signature of a signer with the plurality of information;
extracting at least one partial data item from the multiple partial data items;
second associating a second digital signature with at least one information generated by the generating corresponding to at least one partial data item extracted by the extracting among the plurality of information, the second digital signature indicating an extractor that has operated the extracting; and
storing new streaming data including the at least one partial data item extracted by the extracting, the new streaming data being stored independently of the streaming data and being replayable independently of the streaming data.

2. The method according to claim 1, wherein the plurality of information is a hash data respectively.

3. The method according to claim 1, wherein the streaming data includes at least one header information necessary for playback of the partial data item, the method further comprises:
adding to a first partial data item header information of a second partial data item in the streaming data closest to the first partial data item, when the first partial data item extracted from the multiple partial data items by the extracting does not include the header information,
wherein the new streaming data includes the header information added by the adding when the new streaming data includes the first partial data.

4. The method according to claim 3, wherein the generating generates information based on the first partial data item and the header information of the second partial data item added by the adding with respect to the first partial data item.

5. The method according to claim 1, wherein the streaming data is data in Moving Picture Experts Group (MPEG) format, and each partial data item is a group of pictures in the MPEG format.

6. The method according to claim 1, wherein the streaming data includes at least one header information necessary for playback of the partial data,
the method comprises:
adding to all partial data items which does not include the header information among the multiple partial data items, the header information,
wherein the generating generates the plurality of information based on the multiple partial data items including the header information included in the streaming data and the added header information added by the adding.

7. The method according to claim 6, further comprising:
generating binary trees concerning the streaming data, having leaves respectively indicating the plurality of information generated by the generating.

8. The method according to claim 7, further comprising:
generating a first verification information with regard to the streaming data and in which a root of the binary trees is recoded.

9. The method according to claim 6, further comprising:
generating a first verification information with regard to the streaming data;
generating a second verification information with regard to at least one partial data item extracted by the extracting, the second verification information including number of the multi partial data items, a start position information of at least one partial data item extracted by the extracting in the streaming data, and number of at least one partial data item extracted by the extracting; and
verifying at least one partial data item extracted by the extracting with respect to the streaming data based on the first verification information and the second verification information.

10. The method according to claim 1, further comprising:
comparing a third digital signature including the first digital signature and the plurality of information associated by the first associating and a fourth digital signature including the second digital signature and at least one information generated by the generating associated by the second associating; and
verifying at least one partial data item extracted by the extracting with respect to the streaming data.

11. The method according to claim 1, wherein at least one partial data item extracted by the extracting includes a first partial data item and a second partial data item following the first partial data item, and
the first partial data item includes a header information with the respect to the first partial data item and the second partial data item does not include a header information with the respect to the second partial data item.

12. The method according to claim 11, further comprising:
adding the header information with respect to the first partial data item to the second partial data item; and
verifying at least one partial data item extracted by the extracting with respect to the streaming data based on each header information.

* * * * *